US011769086B2

(12) United States Patent
Law et al.

(10) Patent No.: US 11,769,086 B2
(45) Date of Patent: Sep. 26, 2023

(54) APPLICATION-BASED COMMERCIAL GROUND TRANSPORTATION CLEARINGHOUSE SYSTEM

(71) Applicant: The City and County of San Francisco, San Francisco, CA (US)

(72) Inventors: Ian Law, San Francisco, CA (US); Humphrey Loe, San Francisco, CA (US)

(73) Assignee: The City and County of San Francisco, San Francisco, CA (US)

( * ) Notice: Subject to any disclaimer, the term of this patent is extended or adjusted under 35 U.S.C. 154(b) by 112 days.

(21) Appl. No.: 17/666,098

(22) Filed: Feb. 7, 2022

(65) Prior Publication Data
US 2022/0164724 A1    May 26, 2022

Related U.S. Application Data

(60) Division of application No. 16/719,844, filed on Dec. 18, 2019, now Pat. No. 11,244,254, which is a continuation-in-part of application No. 16/387,366, filed on Apr. 17, 2019, now Pat. No. 10,535,021, which is a continuation of application No. 14/587,257, filed on Dec. 31, 2014, now abandoned.

(51) Int. Cl.
| | |
|---|---|
| *G06Q 10/06* | (2023.01) |
| *G06Q 30/04* | (2012.01) |
| *G06F 16/23* | (2019.01) |
| *H04W 4/021* | (2018.01) |
| *G07B 15/06* | (2011.01) |
| *G07B 15/00* | (2011.01) |

(52) U.S. Cl.
CPC ......... *G06Q 10/06* (2013.01); *G06F 16/2322* (2019.01); *G06Q 30/04* (2013.01); *G07B 15/00* (2013.01); *G07B 15/06* (2013.01); *H04W 4/021* (2013.01)

(58) Field of Classification Search
CPC .... G06Q 10/06; G06Q 30/04; G06F 16/2322; G07B 15/00; G07B 15/06; H04W 4/021
See application file for complete search history.

(56) References Cited

U.S. PATENT DOCUMENTS

| | | |
|---|---|---|
| 8,554,608 B1 | 10/2013 | O'Connor |
| 8,750,895 B2 | 6/2014 | Grosman et al. |
| 9,389,096 B2 | 7/2016 | Holden et al. |
| 2004/0219933 A1 | 11/2004 | Faith |
| 2008/0129548 A1 | 6/2008 | Firestone |
| 2008/0151051 A1 | 6/2008 | Konno et al. |
| 2010/0090852 A1 | 4/2010 | Eitan et al. |

(Continued)

*Primary Examiner* — Ramsey Refai
(74) *Attorney, Agent, or Firm* — Dergosits & Noah LLP

(57) ABSTRACT

A management system for a Permitting Authorities (PA) or their appointed designee to monitor and track application-based commercial ground transportation (ABCT) providers activities within electronically-enabled geo-fenced areas associated with the PAs, all without the need for specialized hardware such as transponders or other tracking equipment. ABCT Providers transmit location and/or transaction information for ABCT Vehicles within geo-fenced areas associated with the PAs to a clearinghouse. The clearinghouse parses the location and/or transaction information to identify the corresponding PA. The clearinghouse transmits the received information to the corresponding PAs in near real-time and periodically creates invoices for each PA based on the activities taken place within the respective goes-fenced areas.

32 Claims, 14 Drawing Sheets

(56) References Cited

U.S. PATENT DOCUMENTS

| | | |
|---|---|---|
| 2013/0031029 A1 | 1/2013 | Davidson |
| 2015/0099461 A1 | 4/2015 | Holden et al. |
| 2015/0271290 A1 | 9/2015 | Tao et al. |
| 2016/0086391 A1 | 3/2016 | Ricci |
| 2016/0171574 A1 | 6/2016 | Paulucci et al. |
| 2016/0203651 A1 | 7/2016 | Heath et al. |
| 2016/0253617 A1 | 9/2016 | Truong et al. |
| 2017/0193404 A1 | 7/2017 | Yoo et al. |

FIGURE 9B

Https://InternationalAirport.com

International Airport

GeoFence & Permit Upload

Permit Display Name — Action

- IA Permit Lyft (Oct. 2014)
- IA Permit Lyft (Nov. 2014)
- IA Permit SideCar (Feb. 2017)
- IA Permit Wingz (Nov. 2018)

GeoFence files require zip, geojson, or kml format. Permit files require pdf format.

*File Display Name  [Select File]

[Upload]

[Create GeoFence]

International Airport Geofence
Edit | Remove | Download

Locations
A* next to the GeoFence Display Name means that the GeoFence needs to be processed by DTIS

FIGURE 9C

APPLICATION-BASED COMMERCIAL GROUND TRANSPORTATION CLEARINGHOUSE SYSTEM

CROSS REFERENCE TO RELATED APPLICATIONS

The present application is a divisional of U.S. patent application Ser. No. 16/719,844, filed on Dec. 18, 2019, hereby incorporated by reference, which a continuation-in-part of, and claims priority to, U.S. patent application Ser. No. 16/387,366, filed on Apr. 17, 2019, which is a continuation of, and claims priority to, U.S. patent application Ser. No. 14/587,257, filed on Dec. 31, 2014, hereby incorporated by reference.

BACKGROUND

A new mode of online-enabled application-based commercial ground transportation (ABCT) has necessitated a new process for airports or other geographically-defined authorities, or "Permitting Authorities" (PA), to manage such transportation activity.

Commercial transportation plays an important role in carrying passengers to and from airports. Commercial transportation includes taxicabs, limousines, busses, and shuttle vans. Commercial transportation also includes ABCT—online enabled application-based platforms used to connect passengers with drivers using their commercial or personal non-commercial vehicles. ABCT providers include what is known in the State of California as Transportation Network Companies (TNCs). Commercial transportation to and from airports is a lucrative business, with drivers typically earning their highest fares overall on trips to and from airports.

State and local governments regulate the various modes of commercial transportation on public roads, whereas airports regulate their own roadways and commercial activity on their property. Airports must maintain a safe and efficient use of their roadways for the traveling public. Airports must also, as required by federal law, be self sustaining. Airports, therefore, typically issue Permits, leases, or other transactional instruments to commercial ground transportation providers and charge periodic fees, per-trip fees, or other charges to cover the costs to maintain and regulate their roadways.

Traditionally, airports and other PAs have monitored, charged, and managed commercial transportation providers and vehicles through manual systems or permanently-affixed transponder devices to track the movements of vehicles on airport roadways. ABCT has presented a new challenge for airports and other PAs because to place a transponder or other permanent tracking device in a vehicle that is not always used for commercial transportation would be impracticable. It may also be regarded as restrictive by drivers whose private trips to an airport may be tracked by the transponder readers.

What is needed in the art is a way to regulate ABCT provider activities within a PA such as an airport. Specifically, PAs need a management system to monitor and track ABCT-Vehicles through a mobile communication device without the need for specialized hardware such as transponders and/or other tracking equipment.

SUMMARY OF THE INVENTION

The present invention is related to a management system for a Permitting Authority or its appointed designee to monitor and track ABCT provider activity through the ABCT-Driver's mobile device, the ABCT provider's application ("app"), the ABCT provider's computer systems, and the PA's electronically-enabled geographic coordinates ("geo-fence"), all without the need for specialized hardware such as transponders or other tracking equipment. Each mobile communication device associated with an ABCT-Vehicle regularly transmits information to an ABCT provider Information and Communications Technology ("ICT") System when an application on the mobile communication device is active. The information transmitted by the mobile communication device enables the ABCT provider ICT System to identify the ABCT-Driver's identity, the vehicle information, the geographic locus, and/or the ABCT-Vehicle's activity data.

Based on the data received from the mobile communication device, the ABCT provider ICT System determines if the mobile communication device is within a predefined geo-fenced perimeter. If the mobile communication device is within the geo-fenced perimeter, the ABCT provider ICT System generates a message comprising at least one unique code and transmits the message to a PA ICT System associated with a PA. The unique code includes at least one driver ID and at least one ABCT customer trip transaction code. The PA ICT System generates a report containing the unique code and a vehicle ID and transmits the report to a compliance manager. The PA ICT System may also, in some embodiments, transmit the message to a PA financial server, wherein the PA financial server generates an invoice for each ABCT provider activity taking place within the geo-fence.

BRIEF DESCRIPTION OF THE DRAWINGS

FIGS. 9A-9C illustrate a system for managing the activity of multiple ABCT providers at multiple PAs, according to an exemplary embodiment of the present invention.

DETAILED DESCRIPTION

Figure 1:
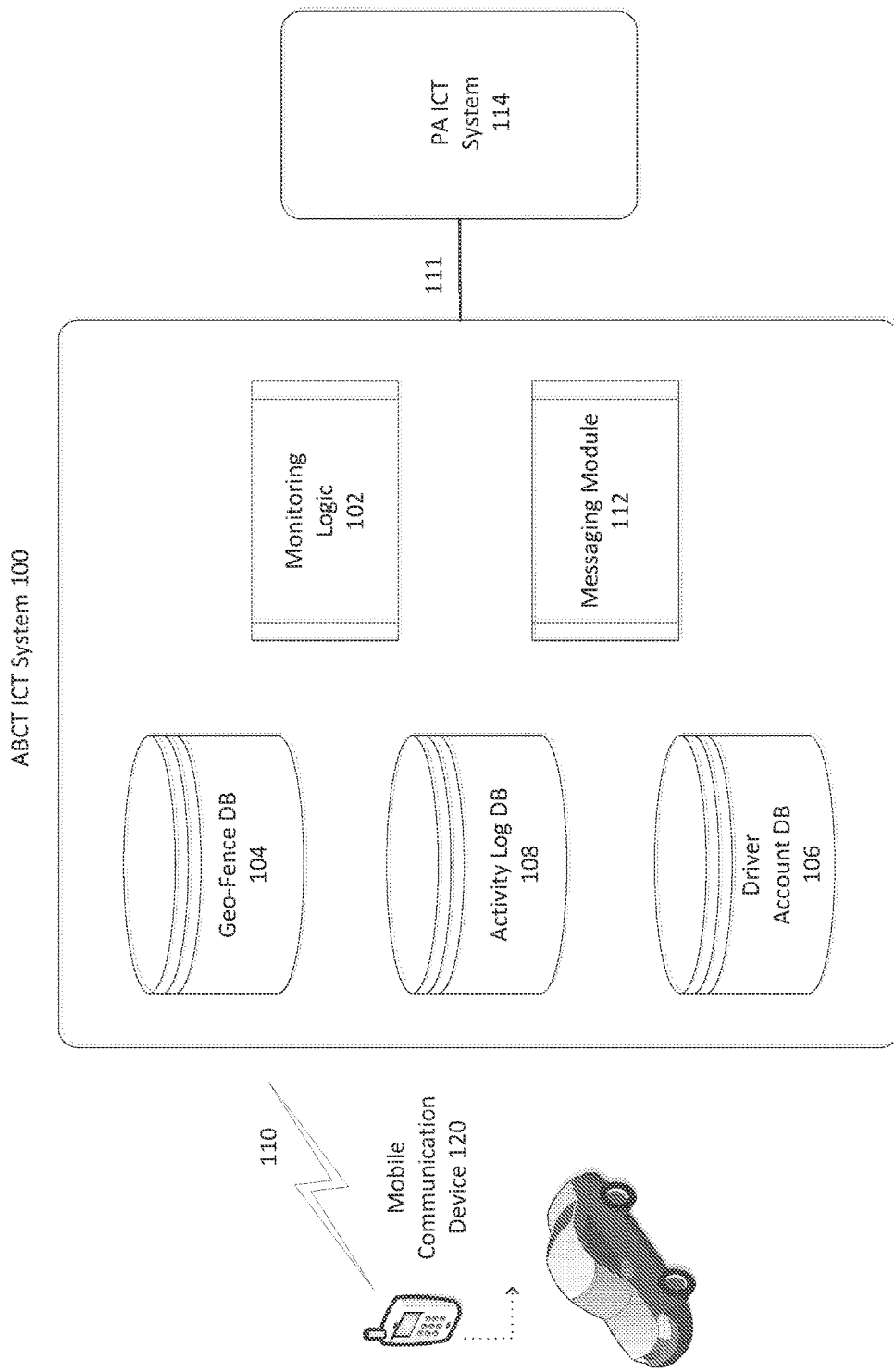
FIG. 1 illustrates a system for managing an ABCT-Vehicle based on location and activity data, according to an exemplary embodiment of the present invention.

The present invention discloses systems and methods for a PA to manage the activities of an ABCT provider.

Overview

An ABCT provider is a company that uses an online-enabled platform to connect passengers with ABCT-Drivers who are using their commercial or personal, non-commercial, vehicles to transport passengers. The ABCT-Drivers communicate with ABCT providers and passengers via mobile communication devices, such as a smart phone.

Each mobile communication device associates an ABCT-Driver with an ABCT-Vehicle and an ABCT provider through the use of an app within the ABCT-Driver's communication device. The ABCT-Driver's app communicates with the ABCT provider ICT System. When active, the application within the ABCT-Driver's mobile communications device transmits the geographic location of the ABCT-Vehicle at regular intervals to the ABCT provider. The ABCT provider uses this information to show ABCT customers the location of nearby ABCT-Vehicles.

The ABCT provider uses the most recent geographic coordinates of the mobile communication device to determine whether the mobile communication device is inside a PA's geo-fence. The geo-fence may comprise one or more polygons whose vertices are geographic coordinates based on a standard coordinates system for Earth such as WGS84. The ABCT provider ICT System transmits to the PA ICT System associated with the geo-fence an information message at regular intervals throughout the time that the ABCT-Vehicle is within the PA's geo-fence. The use of multiple geo-fence polygons provides the PA the ability to monitor and manage the movement of ABCT-Vehicles within the PA's property.

The PA ICT System receives the information messages from ABCT ICT System, which specifies ABCT provider's activities on the PA's property. The PA ICT System stores the ABCT provider information messages. There are at least 5 different types of information message. The message type is identified within the body of each message:

1. PR—a Presence information message signifies the vehicle is within a geo-fence.
2. EN—an Entry information message is transmitted once on geo-fence entry.
3. EX—an Exit information message is transmitted once on geo-fence exit.
4. DO—a Drop Off information message is transmitted once when an ABCT-Driver closes a transaction, i.e. collects a fare, within the PA's geo-fence.
5. PU—a Pick Up information message is transmitted once when an ABCT-Driver initiates a transaction, i.e. starts a trip, with an ABCT customer within the geo-fence.

Based on a predetermined set of business rules, a PA ICT System may generate a financial invoice for any of the activities listed above and performed by an ABCT provider within a geo-fenced perimeter.

In one embodiment, the active mobile communication device app transmits to an ABCT provider ICT System a unique code with the coordinates of the ABCT-Vehicle, which identifies to the ABCT provider ICT System, both the specific identity of the ABCT-Driver and the specific ABCT provider customer transaction.

The ABCT provider ICT System generates a message comprising the unique code, which ties both trip and driver, the ABCT ID, the message type, the vehicle identity, the date and time and the geographic coordinates to the PA ICT System. The PA Permit may specify the format of the message contents that ABCT providers are required to provide to the PA. The unique code allows the PA to both validate the ABCT-Driver's identity with the ABCT provider and authenticate the ABCT-Driver's trip at a curbside inspection.

The PA ICT System relays the vehicle identity and the ABCT provider's unique code to the PA's compliance managers who manage curbside enforcement of PA's ground transportation rules and regulations. The compliance manager can compare and verify the ABCT provider's unique code, provided by the ABCT provider ICT System, with the code presented on the ABCT-Driver's communications device.

The PA ICT System also relays those information messages which trigger transaction charges to the PA's financial engine. The PA's financial engine collates individual ABCT provider transaction information, reconciles the information with a predetermined set of business rules for invoicing and issues invoices to the ABCT provider.

In another embodiment, a third party such as a national or regional clearinghouse may be used to manage transaction fee collection from ABCT providers because deploying app-based ground transportation management systems, as described above, in every PA can be costly and inefficient to PAs and ABCT providers. A PA provides geo-fence information to a third party which forwards those data to participating ABCT ICT Systems. The ABCT ICT Systems provide information messages to the third party ICT Systems relating to activities within the geo-fenced perimeter of a plurality of PAs. The third party aggregates all transaction data relating to specific ABCT providers and issues invoices to respective ABCT providers. The ABCT providers, in turn, provide transaction fee payments for the invoices to the third party.

Definitions

"Mobile communication device", as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). Mobile communications devices may be built into vehicles for the purpose of transmitting vehicle geo-locational and other data.

"Communication channel", as used herein and throughout this disclosure, refers to a wireless network, a wireline network, or any network including a combination of wireless and wireline network elements. A communication channel can include broadband wide-area networks, local-area networks, and personal area networks. Communication across a communication channel is preferably packet-based; however, radio and frequency/amplitude modulations networks can enable communication between communication devices using appropriate analog-digital-analog converters and other elements. Examples of radio networks include cellular (GPRS, UMTS, TDMA, CDMA, etc.), Wi-Fi, BLUETOOTH® networks, etc., with communication being enabled by hardware elements called "transceivers." Some mobile communication devices may have more than one transceiver, capable of communicating over different networks. For example, a cellular telephone can include a GPRS transceiver for communicating with a cellular base station, a Wi-Fi transceiver for communicating with a Wi-Fi network, and a positioning satellite receiver for receiving a signal from a positioning satellite. A communication channel typically includes a plurality of elements that host logic for performing tasks on the telecommunication network. In modern packet-based wide-area networks, servers may be placed at several logical points on the telecommunication network. Servers may further be in communication with databases and can enable communication devices to access the contents of a database. A server can span several network elements, including other servers in the telecommunication network.

"Geo-fence", as used herein and throughout this disclosure, refers to a virtual perimeter on a geographic area, as defined with standard geographic coordinates based on a standard coordinates system such as WGS84, agreed by a Permitting Authority with a service provider. A geo-fence is based on (Global Positioning Satellite) GPS coordinates defined on a specific coordinates system. A geo-fence can be any shape known in the art, such as for example, a polygon defined by four points. In a telecommunication network, a mobile communication device is location-aware in that it usually is capable of estimating its geo-location by communicating with local cell-sites and other network infrastructure. The mobile device can make its geo-location data available to applications running within the device. These applications can send/transmit these data to applications/systems elsewhere. The mobile communication device may respond with a notification, an application, or interaction with connected hardware such as a smart vehicle. For instance, geo-fences may be used to notify parents of children leaving designated areas, shut down a vehicle before entering a restricted area, etc.

An "activity" as used herein and throughout this disclosure, includes being within a geo-fence, entering a geo-fenced perimeter, exiting a geo-fenced perimeter, performing a pick-up service within a geo-fenced perimeter or performing a drop-off service within a geo-fenced perimeter.

FIG. 1 shows a system for monitoring the activity of a driver associated with an ABCT provider, according to an exemplary embodiment of the present invention. The system includes a mobile communication device 120 associated with an ABCT-Driver communicating with an ABCT ICT System 100 across a communication channel 110. In one embodiment, each mobile communication device comprises an app, wherein the app associates an ABCT-Driver with an ABCT-Vehicle and an ABCT provider. The application communicates with the ABCT ICT System via a communication channel 110.

The ABCT ICT System 100 comprises at least a geo-fence database 104, a driver account database 106 and an activity log database 108.

The geo-fence database 104 stores a plurality of geo-fences. Each geo-fence defines a perimeter, entry to which is monitored and controlled by a PA, and inside of which an ABCT provider pays a fee for conducting business. In one embodiment, a plurality of geo-fences can define a perimeter which is monitored and controlled by a PA.

The driver account database 106 stores a plurality of driver account information, which may include a unique ID associated with the driver, driver's name, driver's social security number, and driver's license number. Each driver account is linked to at least one mobile communication device and at least one vehicle. In one embodiment, the driver account database 106 can be invoked to determine which driver is conducting business within the geo-fence perimeter.

The activity log database 108 stores a log of the location of the ABCT-Vehicle. In one embodiment, each activity performed by a driver may also be stored in the activity log database. Such activities may include: presence within a geo-fence, entry into the geo-fenced perimeter, exit out of the geo-fenced perimeter, a pick-up activity and a drop-off activity.

Each element in FIG. 1 can communicate with other elements directly or indirectly, and can communicate with other elements wired or wirelessly.

In accordance with a preferred embodiment, the ABCT ICT System 100 receives a plurality of location information from each mobile communication device 120. The location information is sent from each mobile communication device on a periodic basis. For example, a mobile communication device may send location information to the ABCT provider ICT System every 5 seconds. In one embodiment, activity information is also sent along with the location information. The location information, information associated with the mobile communication device, and/or the activity information is stored in the activity log database 108.

The location information is determined by GPS technology on mobile communication device 120, by methods known in the art, such as performing a signal strength triangulation from antennas nearby mobile communication device 120. Logical elements on network such as a LoCation Services (LCS) client, a Gateway Mobile Location Center (GMLC) server, Secure User Plane Location (SUPL) server, are not shown, but can be used to determine a precise location of device 120, by methods known in the art. PAs may provide local Wi-Fi services to enhance the accuracy of the geo-location data.

As each location information is received by the ABCT ICT System 100, the monitoring logic means 102 determines if the location of the mobile communication device is within a predefined geo-fenced area. To that end, the monitoring logic means 102 references the geo-fence coordinates stored in the geo-fence database 104 and compares them to the location information received by each mobile communication device.

A messaging module 112 of the ABCT ICT System 100 generates a message, in real-time, once the monitoring logic module 102 determines that the location of a mobile communication device is within a geo-fence. According to an embodiment, the message comprises a header including a driver ID, trip ID, ABCT ID, vehicle license plate ID, activity time stamp, activity data, number of customers using the ABCT service associated with the activity data, and geographic locus associated with the mobile communication device within the geo-fence. To generate the message, the messaging module 112 may access the geo-fence database 104, the driver account database 106 and/or the activity log database in 108 in order to generate the message. In an embodiment, the message format is provided in a format that adheres to the format defined in a PA Permit.

In one embodiment, the messaging module uses the HTTPS protocol to post data associated with a permitted activity. The activity data may be posted to a URL with the following URL encoding employed: https://216.9.96.29:8443/ABCT/services/audit?uid="<value>"&ABCT_id="<value>"&licence_plate="<value>"&timestamp="<value>"&txn_type="<value>"&ride_count="<value>"&lon="<value>"&lat="<value>".

The ABCT monitoring server 100 transmits the message, in real-time, to a PA ICT System 114 for monitoring activities of a driver associated with a mobile communication device and for billing via a communication connection 111. The PA ICT System 114, in turn, generates an invoice for all the fees associated with the activities provided by the ABCT provider within the geo-fenced perimeter, and provides it to the ABCT provider for payment.

In another embodiment, the ABCT ICT System 100 transmits the message, in real-time, to a third party such as a national or regional clearinghouse, for invoicing. The third party, in turn, generates an invoice for all the ABCT provider permitted activities occurring within the geo-fence perimeter by the ABCT-Driver.

Figure 2:
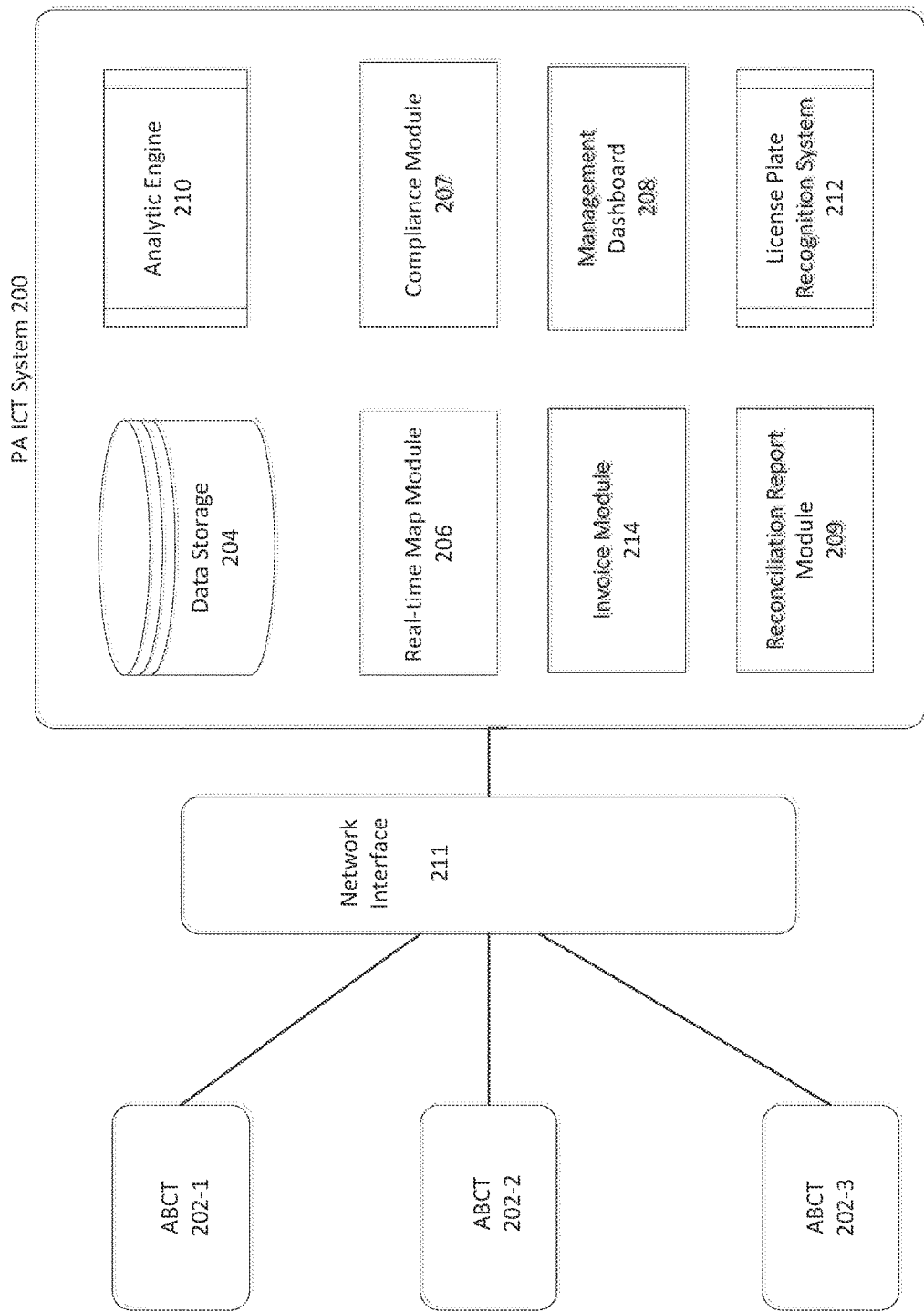
FIG. 2 illustrates a system for managing an ABCT provider permitted activity on a PA property.

FIG. 2 shows a system for monitoring ABCT activity within the perimeters of a geo-fence area, according to an exemplary embodiment of the present invention. The system includes PA ICT System 200 communicating with a data storage means 204 for storing messages received from ABCT providers 202 via a communication connection known in the art. In one embodiment, data is extracted from the received messages and stored in a relational database. In another embodiment, the messages are stored in the data storage as data logs.

The PA ICT System 200 includes a data storage means 204 operatively connected to an analytic engine 210. Other components of the PA ICT System 201 may include a real-time map module 206, a compliance manager module 207, a management dashboard module 208, and a reconciliation report module 209. Each module may generate queries that involve retrieving data from the data storage 204 or may automatically receive specified data from the data storage 204.

The PA ICT System 200 also includes a network interface 211 enabling each of a plurality of ABCT providers 202 to communicate with the PA ICT System 200 through a communication connection known in the art. Each time an ABCT provider 202 transmits a message to the PA ICT System 200, via the network interface 211, the messages may be stored in the data storage means 204. In one embodiment, the messages are logged. In another embodiment, data from the messages is extracted and segregated into functional areas for analytic purposes. For example, data identifying the ABCT-Vehicle and the activity may be collected and stored as tables that the PA ICT System 200 maintains to describe each ABCT provider 202 activity within the geo-fenced area.

The real-time map module 206 may automatically receive data relating to the location of an ABCT-Driver each time a message is received by the PA ICT System 200. In one embodiment, each time a message is received from an ABCT provider 202 and stored in the data storage means 204, the license plate, longitude and latitude information contained in the message is transmitted to the real-time map module 206. In a preferred embodiment, the real-time map module 206 has a map of the geo-fence perimeter and is overlaid with icons representing the real-time location of the ABCT-Drivers. The real-time map module 206 updates a map with the received information. In one embodiment, the icons are color coded based on which ABCT provider 202 they are associated with. Additionally, a user may be able to click or select the icon, such that additional information is displayed, such as driver ID, license plate number, or an associated ABCT provider.

The compliance module 207 may generate a report comprising the transaction history of all ABCT provider 202 activities within a geo-fenced perimeter. The report may be generated in real-time and may also comprise transaction history of ABCT provider 202 activity within a specified time period. For example, the report may include transaction histories of ABCT provider 202 activities within the last hour or within the last day. In one embodiment, the report may include the date and time range each ABCT provider 202 vehicle has been within the geo-fenced perimeter, the ABCT ID, the license plate number of the ABCT-Vehicle, and the activity the ABCT-Vehicle is engaged in. For example, one entry in the report may indicate the following information for a vehicle associated with the ABCT provider 202 that was in the geo-fenced perimeter: the vehicle was in the geo-fenced perimeter for 20 minutes, has dropped off a passenger, the vehicle's license plate number being, for example, SDXZ268, and the ABCT provider name.

In one embodiment, the compliance module 207, via the analytic engine 210, may compare the information contained in each message with a set of business rules to determine ABCT provider violations. For example, the compliance module may determine that an ABCT-Vehicle has been within a geo-fenced perimeter for more than an allotted time period as specified by a set of business rules. This information may be transmitted, in real time, to a mobile communication device associated with a compliance manager.

In another embodiment, the compliance module 207, via the analytic engine 210, may, for each incoming message from the plurality of ABCT providers, transmit the ABCT-Vehicle identity associated with the incoming message and the ABCT provider unique code to a mobile communication device associated with a compliance manager.

The report generated by the compliance module 207 may be transmitted and displayed on a computing device, such as a smart phone, laptop or computer. The display may comprise dynamic list views and detail pages. The list view may comprise various combinations of information included in the messages received by the ABCT providers. For example, the list view may include the time the mobile communication device entered the geo-fence, the duration of time in the geo-fence, the license plate number associated with the mobile communication device, and the ABCT provider. The list may be updated or a particular field in a list may be updated. In one embodiment, a system user can select to subscribe to updates of fields in data records, thereby ensuring that the user receives only the updates that the user selected to receive and when the user selects to view the updates.

Figures 3A, 3B:
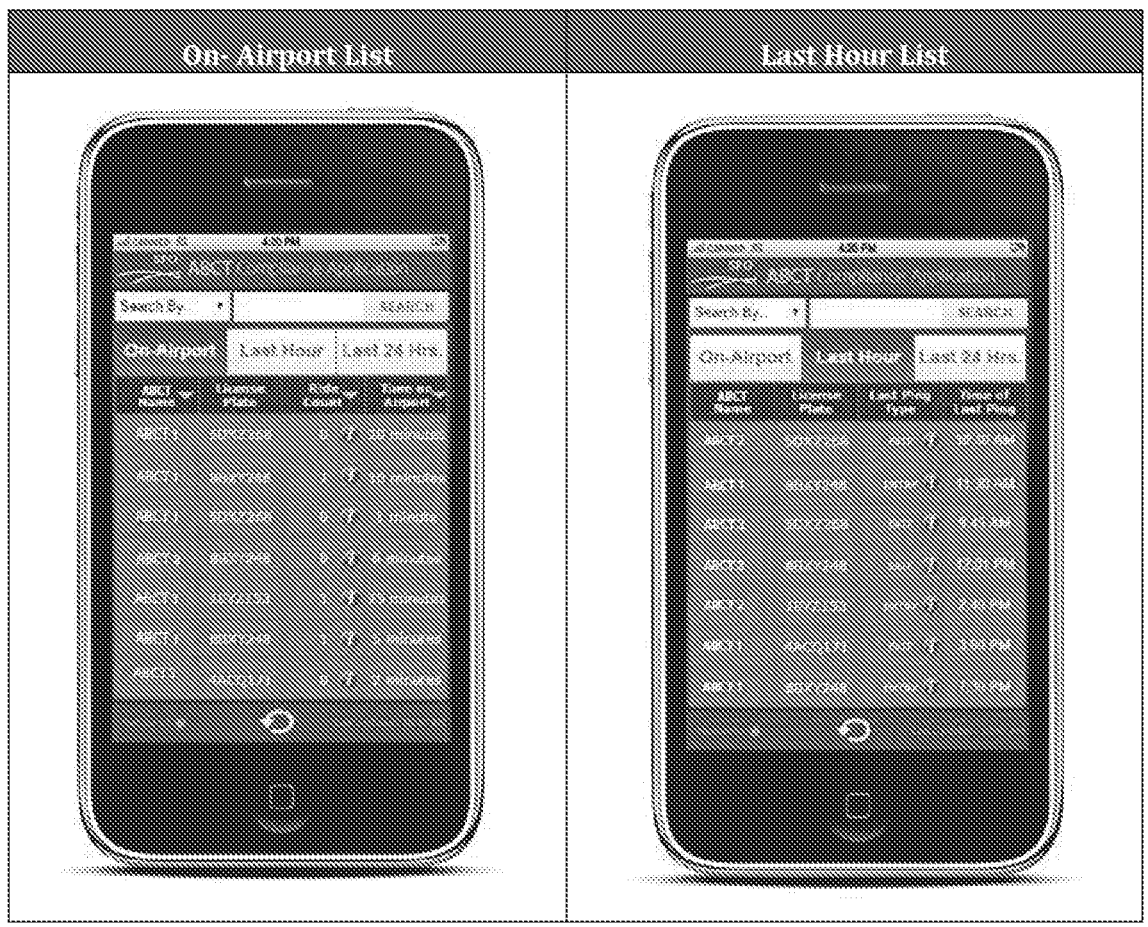
FIGS. 3A-3F illustrate graphic user interface (GUI) of a compliance report, according to an exemplary embodiment of the present invention.
Figures 3C, 3D:
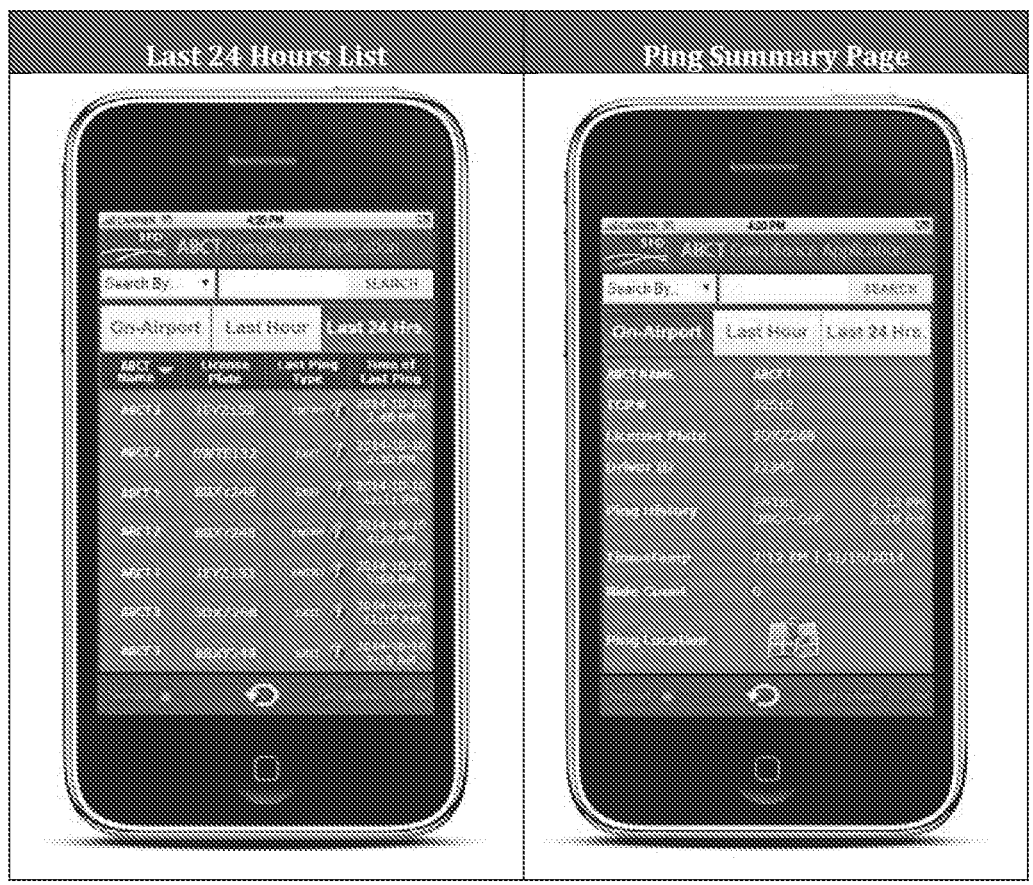

In a preferred embodiment, the compliance module 207 will send the report to an application on a mobile computing device associated with compliance manager. The report may be in the form of a GUI, wherein the compliance manager may interact with the information contained in the report, as illustrated in FIGS. 3A-F. According to the preferred embodiment, the GUI displaying the report will include three real-time lists that will contain detailed information of all ABCT provider transactions taking place within the PA geo-fence. An "On-Site" list will display all ABCT-Vehicles present within the geo-fence perimeter, as illustrated in FIG. 3A. A "Last Hour" list will display all ABCT provider activity within the last hour within the geo-fence perimeter, as illustrated in FIG. 3B. And, a "Last 24 Hour" list will include all ABCT provider activity that has taken place within the geo-fence perimeter within the last 24 hours of the current time, as illustrated in FIG. 3C. The GUI may also display a summary of the information relating to a vehicle if a compliance manager selects or clicks on an item in the list, as illustrated in FIG. 3D.

Each list within the GUI display may have some of the following information: ABCT Name; License Plate; Ride Count; Time on PA property; Customer Transaction Type; and Time of Last Message. This information may be extracted by the analytic engine 210 from each message received by the PA ICT System 200 from each ABCT provider 202 and transmitted to the compliance module 207 to generate or update a report. In one embodiment, the report is a virtual list view in a web application that is dynamically updated such that a compliance manager can seamlessly access and manage the presented information.

Figures 3E, 3F:

The GUI displaying the report may provide functionality to query each report for specific information contained in the report, as illustrated in FIG. 3E. For example, a compliance manager may query the report for a license plate number or transactions associated with ABCT provider. If the license plate number or transaction is in the report, the officer has confirmation that the vehicle has been authorized by the ABCT provider and that the trip has been reported to the PA. If the plate number is not on the list, the officer has evidence of a potential violation of a set of business rules associated with the ABCT provider's operating permit.

The GUI display also provides a view of a list of ABCT-Vehicles currently reported to be on PA property. The officer can use this information to identify ABCT-Vehicles that are operating without proper visual identifiers (ABCT provider trade dress and placard), which may be a potential violation of a set of business rules associated with the ABCT provider's operating permit.

The GUI display provides a view of a list of ABCT-Vehicles that are on PA property and that have exceeded the allowable dwell time. The officer may use this information to identify ABCT-Vehicles that are staging at the PA property which may be a potential violation of a set of business rules associated with the ABCT provider's operating permit.

The GUI display provides a view of the transaction history of a specific ABCT-Vehicle. The officer can use this information to identify potential violations. For example, recurring entry and exit transactions without associated pick-up or drop-off transactions by an ABCT-Vehicle may indicate recirculation on PA roadways which may be a potential violation of a set of business rules associated with the ABCT provider's operating permit.

Each potential violation of a set of business rules associated with the ABCT provider's operating permit may be highlighted in the report using a warning color scheme, as illustrated in FIG. 3F. In one embodiment, each violation may be associated with a different color.

The PA ICT System 200 may also transmit to the mobile computing device associated with compliance manager the map generated by the real-time map module. The map may display the real-time locations of all ABCT-Vehicles and/or ABCT provider transactions within geo-fence perimeter. Such feature will allow compliance managers to quickly locate ABCT-Vehicles during operations.

Figure 4:
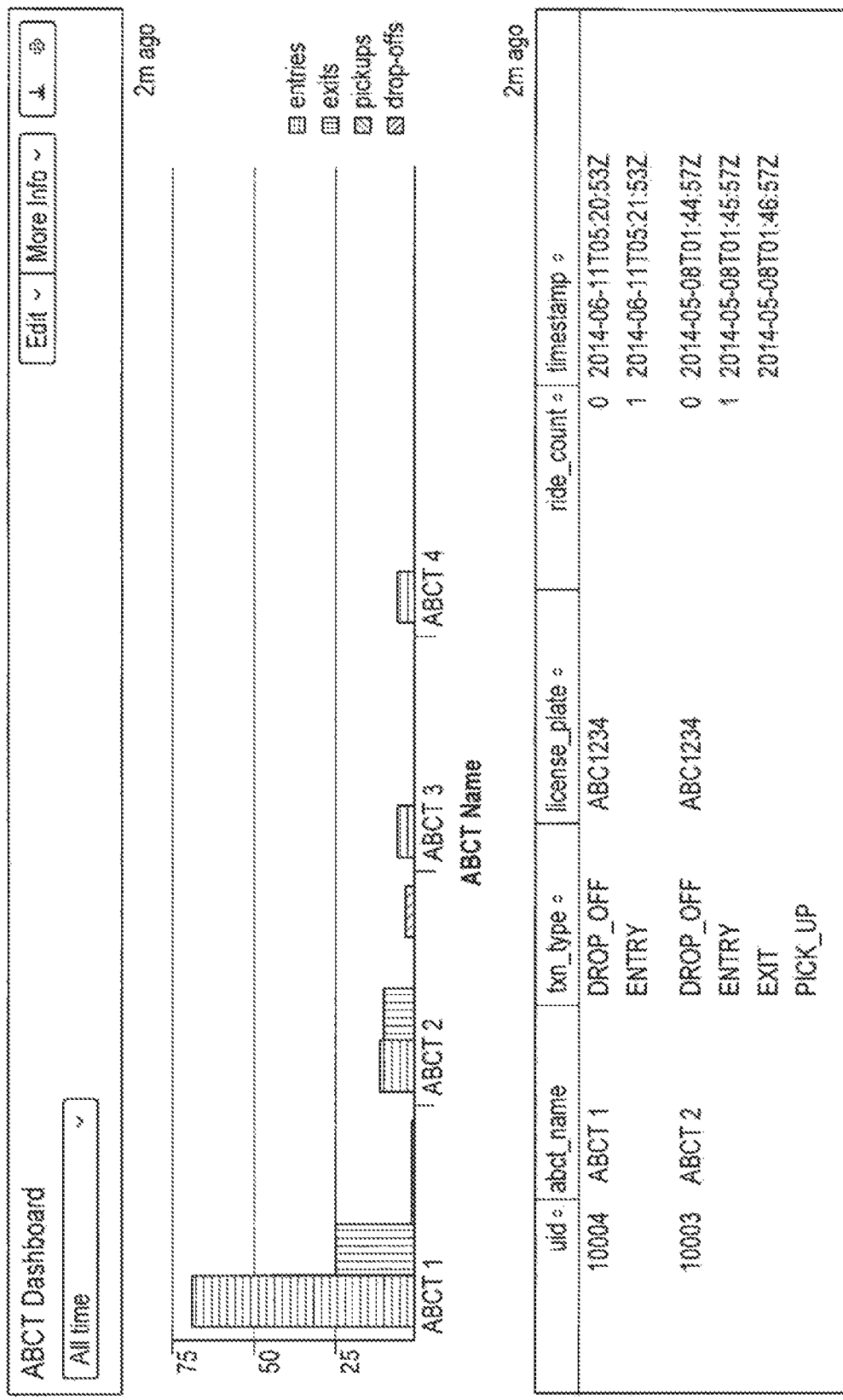
FIG. 4 illustrates a management dashboard display, according to an exemplary embodiment of the present invention.

The management dashboard module 208 may access data from the data storage 204 to generate a report summarizing all ABCT activity for a given time period for each ABCT provider 202. For example, the report may indicate the number of entries, exits, pickups and drop-offs performed by each of the ABCT providers during a specified time period. The generated report may be displayed on a computing device. The information may be displayed in various formats, including but not limited to graphs, tables, logs, and the like, as illustrated in FIG. 4.

Figure 5:
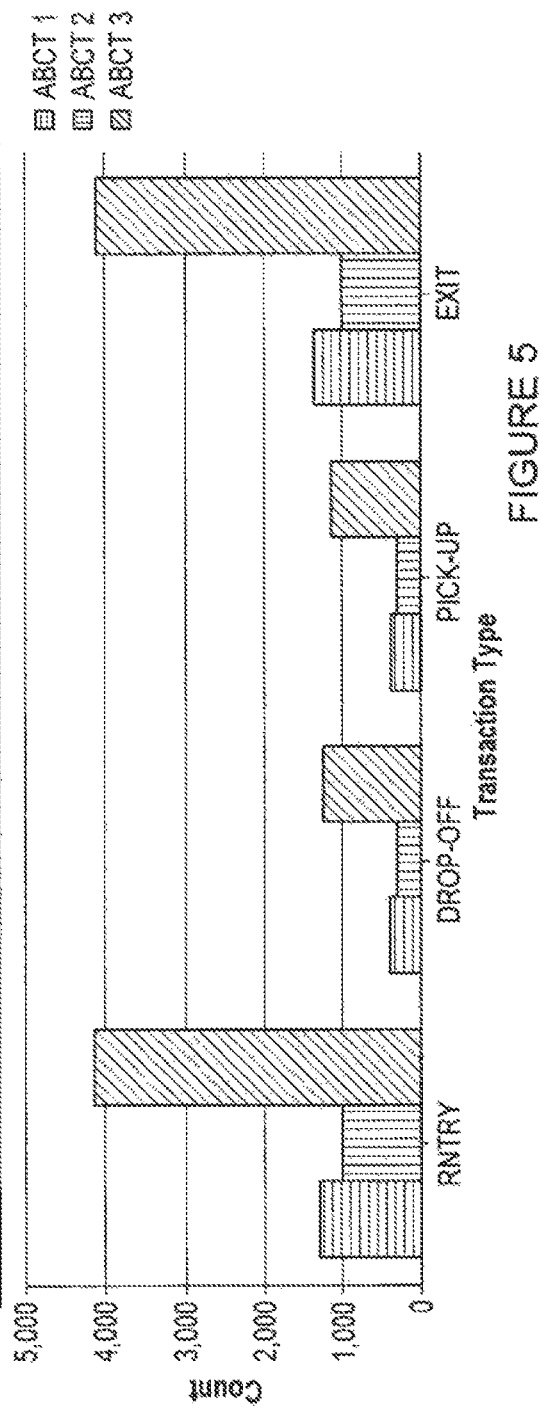
FIG. 5 illustrates a reconciliation report, according to an exemplary embodiment of the present invention.

The reconciliation report module 209 may generate a query for all the activity data of the drivers associated with an ABCT provider 202 during a specified time period and create a reconciliation report, as illustrated in FIG. 5. The reconciliation report comprises all activities occurring in the geo-fenced perimeter for a specific time period. The reconciliation report module 209 may compare the generated reconciliation report for each ABCT provider with an independent reconciliation report prepared by each ABCT. The reconciliation report module 209 may also generate a discrepancy report based on any inconsistency between the generated reconciliation report and the independent reconciliation report. In one embodiment, the reconciliation report may be produced upon request. In another embodiment, the reconciliation report may be produced periodically, such as monthly or yearly.

In some embodiments, an invoice module 214 may generate a query for activity data associated with services provided within the perimeter of the geo-fence for all drivers associated with an ABCT provider 202 during a specified time period. For example, the invoice module 214 may query the data storage 204 for all passenger pick-up services and drop-off services rendered within a PA geo-fence provided by ABCT provider for the month of January. The invoice module 214 will then generate an invoice for the fees associated with services rendered within the perimeter of the geo-fence based on a set of business rules as described in the PA's Permit. The PA ICT System 200 may then transmit the invoice to the ABCT provider 202.

In another embodiment, a financial system (not shown) may be operably connected to the PA ICT System 200. The financial server may access the data storage 204 to query the data stored for activities of an ABCT provider within a geo-fenced area during a particular time period. Based on a set of business rules stored on the financial server, the financial server may create an invoice for the ABCT provider.

Additionally, the PA ICT System 200 includes requisite software interfaces for different types of communication such as an email interface, short message service (SMS) interface, or a network interface. These are merely examples of the types of communication protocol interfaces (not shown) used by the PA ICT System 200 to communicate with various devices used by a compliance manager 212 and a ground transportation unit 213. Moreover, these interfaces can include various sub-components (not shown) such as message servers, protocol stacks, associated databases, and the like.

The PA ICT System 200 may also include a license plate recognition module 212. The license plate recognition module 212 is operatively connected to one or more cameras adapted to independently capture and recognize a license plate image. A camera includes a processor for managing image data and executing a license plate recognition program. The license plate recognition module 212 includes a memory for storing the license plate recognition program and the license plate images taken by an image capture device of the camera. The license plate recognition module 212 may compare the license plate numbers captured by the camera with license plate IDs stored in the data storage 204.

In a preferred embodiment, the license plate recognition involves capturing photographic video or images of license plates, whereby they are processed by a series of algorithms that are able to provide an alpha numeric conversion of the captured license plate images into a text entry. There are seven primary algorithms that the software requires for identifying a license plate: plate localization, which is responsible for finding and isolating the plate on the picture; plate orientation and sizing, which compensates for the skew of the plate and adjusts the dimensions to the required size; normalization, which adjusts the brightness and contrast of the image; character segmentation which finds the individual characters on the plates; optical character recognition; and syntactical/geometrical analysis, which check characters and positions against country-specific rules.

The complexity of each of these algorithms determines the accuracy of the system. During the third phase (normalization), some systems use edge detection techniques to increase the picture difference between the letters and the plate backing. A median filter may also be used to reduce the visual noise on the image. In one embodiment, auxiliary data is also extracted from at least one vehicle image, wherein the auxiliary data comprises information related to physical details of the vehicle.

As the license plate recognition system may also record time and location data in addition to license plate data, license plate image data, and image data of a vehicle. In one embodiment, the data may be collected over an extended period of time and stored for later searching. In another embodiment, the data may be correlated, indexed and/or categorized in the data storage. The collected data may be compared to various existing or other data, such as the messages transmitted to the PA server by the ABCT provider ICT System, and correlated and/or indexed to such data. That collected data may be processed, searched, and/or analyzed for a variety of purposes.

The license plate recognition data may be correlated with ABCT provided data to verify ABCT provider message accuracy. The data may also be used to generate volumetric forecasts and other operational and management information. License plate recognition system may be able to obtain further information from an internal or external network about the vehicle based on the license plate number captured by the license plate recognition system. So, for example, the PA ICT System may be able to determine the make, model, and year of every ABCT vehicle within its geo-fenced area. Alternatively, the PA ICT System may also identify the owner of the car associated with the license plate if it was an ABCT driver and whether the registration fees are currently paid on the car, and a vast variety of other information.

The license plate recognition system may also comprise various features, such as a timer which keeps track of the length of time each vehicle passes two points of interest. If there is a time limit which the ABCT-Vehicle cannot exceed, the system can send a red flag or warning to a compliance manager to indicate that the ABCT-Vehicle has overstayed the time limit. The warning or red flag may be transmitted as a ping or message from the PA server to the mobile computing device application associated with the compliance manager. There are great many other operations that can be performed by the PA ICT System, such as keeping daily logs of all vehicles that have entered or exited the perimeter of the geo-fenced area, which may be useful for law enforcement and other applications.

The PA ICT System, associated with the license plate recognition system, in one embodiment, may automatically generate violation citations for ABCT-Vehicles that have been circling the roadways of the PA for too long, or for cars that are no longer permitted by the ABCT provider to conduct transactions within the perimeter of a geo-fence, or issue alerts to police or security personnel if the system determines that a particular car is stolen (in which case the central computer system would have access to a database of information to identify stolen cars) or is a car for which authorities are looking for some other reason (in which case the PA would have access to a database identifying cars for which authorities are looking).

At any time, a PA compliance manager may conduct an inspection of ABCT-Driver operations at a PA to confirm that such operations comply with the requirements set forth in a set of business rules associated with the ABCT Permit. To perform an inspection, compliance manager will require a real time web-based application that displays information about each ABCT provider trip being performed at the PA. The compliance manager will be the primary user of the compliance manager application. The compliance manager will be responsible for regulating all ABCT provider activity within the geo-fence. In one embodiment, the compliance manager application will receive real-time messages of all ABCT provider transactions dynamically.

Figure 6:
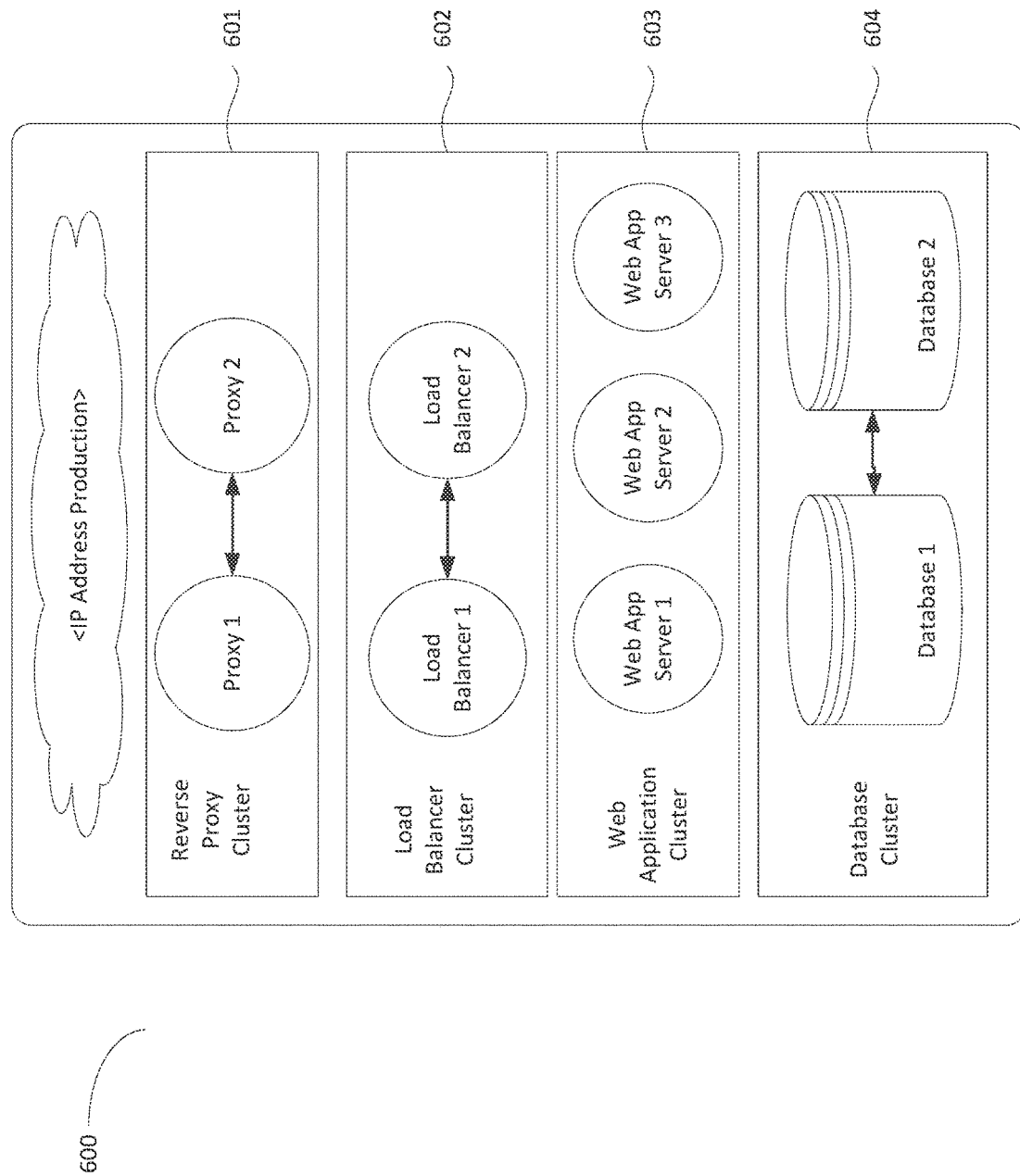
FIG. 6 illustrates a system logical architecture design for the principal message handling components of the PA ICT System.

FIG. 6 illustrates a system logical architecture design for the principal message handling components of the PA ICT System 600. In a preferred embodiment, these components comprise four layers: a reverse proxy layer 601, load balancer 602, web application server cluster 603, and a database 604. The PA ICT System 600 also comprises a network interface to enable each of a plurality of ABCT providers to communicate with the PA ICT System 600 through a communication medium, such as a web service.

Due to the high volume of messages received from the ABCT providers, each component of the PA ICT System layers has a redundancy in order to provide high availability. High availability provides protection from application failures that may arise from power failures, server hardware faults, network hardware faults, configuration errors, application bugs, compatibility or performance issues and other causes. In a preferred embodiment, the PA ICT System 600 is designed to handle a peak load of over 3,000 messages per minute.

According to an embodiment of the invention, as part of the permitting process with a PA, an ABCT provider receives a digital certificate from the PA. The digital certificate is used to authenticate all transmissions between the ABCT provider ICT System and the PA ICT System. The ABCT providers use an HTTPS to transmit secured messages via the communication medium to a PA ICT System 600. The reserve proxy server 601 associated with the PA ICT System 600 is used to take in internet traffic in the HTTPS protocol received from the various ABCT providers. In one embodiment, an SSL reverse proxy cluster shall be the first point of entry of the ABCT provider's messages.

The reverse proxy server 601 inspects the incoming HTTPS requests from an ABCT provider and authenticates the ABCT provider ICT System with additional authentication methods known in the art. Once authentication and any local processing is completed, the HTTPS requests are forwarded to a load balancer 602. The reverse proxy server 601 transmits a response to the request back to the ABCT provider ICT Systems containing the proper host names.

In one embodiment, the reverse proxy server 601 is configured with a public DNS host name and publicly routable IP address. Thus, any links that are made available to users will resolve to the public IP address or DNS hostname of the reverse proxy server 601. The reverse proxy server 601 then performs mapping of the external HTTPS request to the proper internal server.

Firewalls will enable certain network traffic from the public internet to the internal data service for the application. Only relevant and necessary ports and protocols shall be allowed through the firewall.

Once the HTTPS requests are received by the load balancer 602, they will be forwarded to different web-service nodes. The load balancer will be used in order to provide load balancing 602 between web-service nodes. The load balancer 602 distributes the incoming HTTPS requests to various nodes in the web application server cluster 603 and to provide the SSL protocol for encryption and decryption of the HTTPS stream.

The load balancer 602 acts upon data found in the application layer protocol such as the HTTPS. The requests are received by the load balancer 602 and are distributed to a particular server based on a configuration algorithm, such as a round robin, a weighted round robin, a least connection, or at least response time.

Web service clusters 603 comprise a plurality of web application servers or nodes. The nodes are deployed in a cluster that can be expanded by adding more nodes into the cluster for horizontal scalability. In one embodiment, there is a three-node cluster comprising Tomcat web application containers that host the VTS web service API and the compliance manager web service API.

The Database layer 604 shall be configured as an active/passive pair of database nodes. This configuration will provide just in time recovery and redo logs. Active/passive database nodes process on one node, making it the active node for that configuration. The IP address of the active node is mapped to a virtual "node address". If the active node fails, a failure safe module takes care of fail-over: it starts the process on a passive database, making it the active node, and remaps the node address to the new active node's IP address. In most circumstances of a failure, the fail-over will occur quickly.

Figure 7:
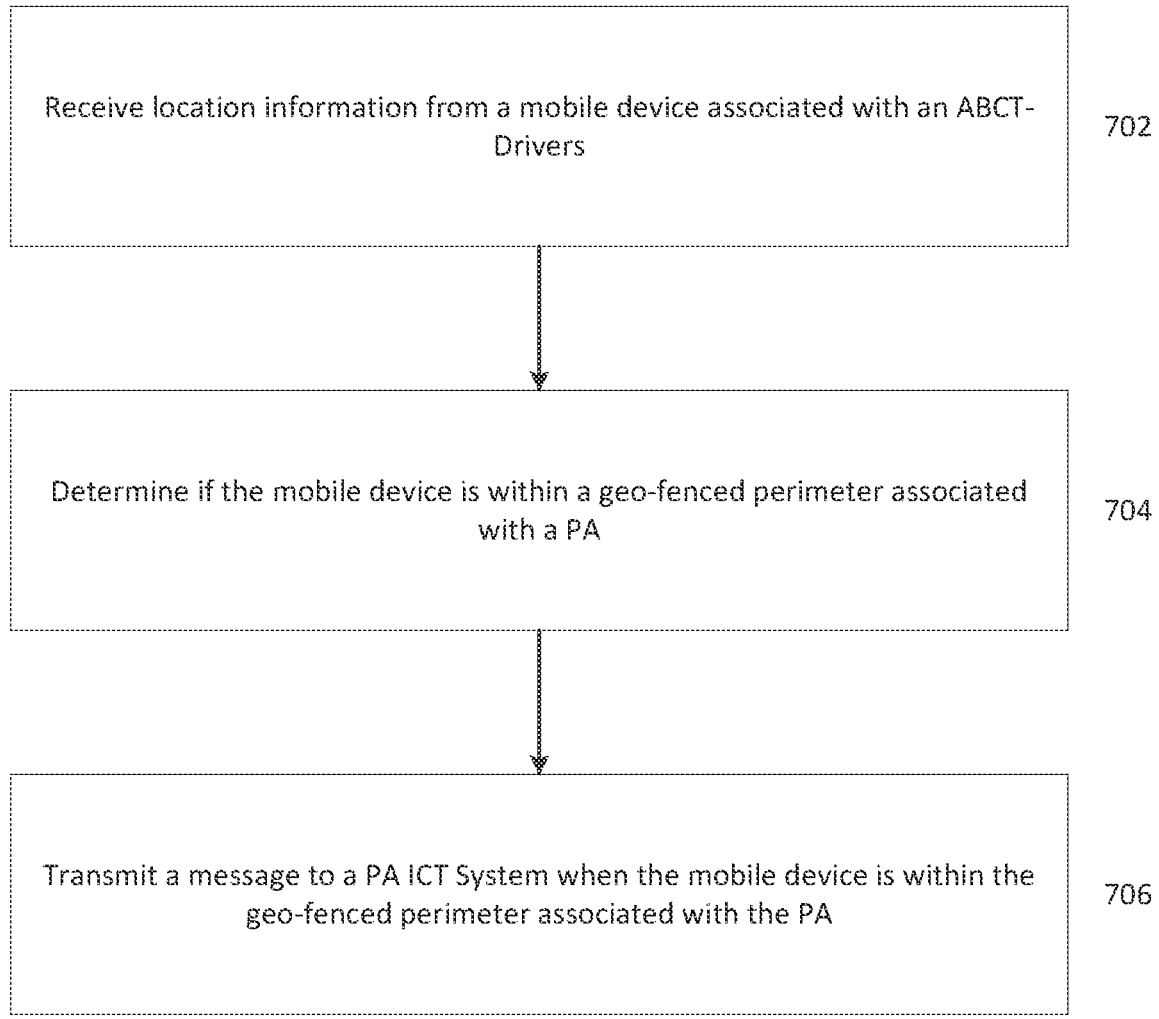
FIG. 7 illustrates a method for managing an ABCT-Vehicle based on location and activity data, according to an exemplary embodiment of the present invention.

FIG. 7 shows a method for monitoring activities of an ABCT-Driver, according to an exemplary embodiment of the present invention. The method begins at step 702, where an ABCT provider ICT System associated with an ABCT provider receives periodic location information from a mobile device associated with an ABCT-Driver. In one embodiment, the mobile device transmits a message to the ABCT provider, wherein the message includes at least the geo-location of the mobile device (ABCT-Driver) and a date and timestamp.

At step 704, the ABCT provider ICT System determines if the mobile device is within a predefined geo-fence perimeter based on the location information received from the mobile device.

At step 705, when a determination is made that the location of the mobile device is within a predefined geo-fence perimeter, the ABCT provider ICT System transmits a message to a PA ICT System. The message includes information related to location of the mobile device, identification of the driver and activity data. In one embodiment, the ABCT ICT System generates a message comprising a header which includes geographic locus, trip ID, ABCT ID, vehicle license plate ID, activity time stamp, activity data, and number of users using the ABCT service associated with the activity data along with the location information.

Though this embodiment of the method is performed by a PA ICT System, other servers or network elements may work in tandem with the PA ICT System to accomplish the method. Furthermore, each task of the method may be assigned to a different network element, each network element being suited to perform the task assigned. For instance, a database server may be more suited to referencing the geo-fence database, and a location server may be more suited to making a location determination before forwarding it to the PA ICT System. When connections traverse geo-fences, such as in a moving vehicle, an algorithm may be employed to split the charge of the connection between fee rates based on the amount of time within each geo-fence, amount of data transferred within each geo-fence and the like.

Figure 8:
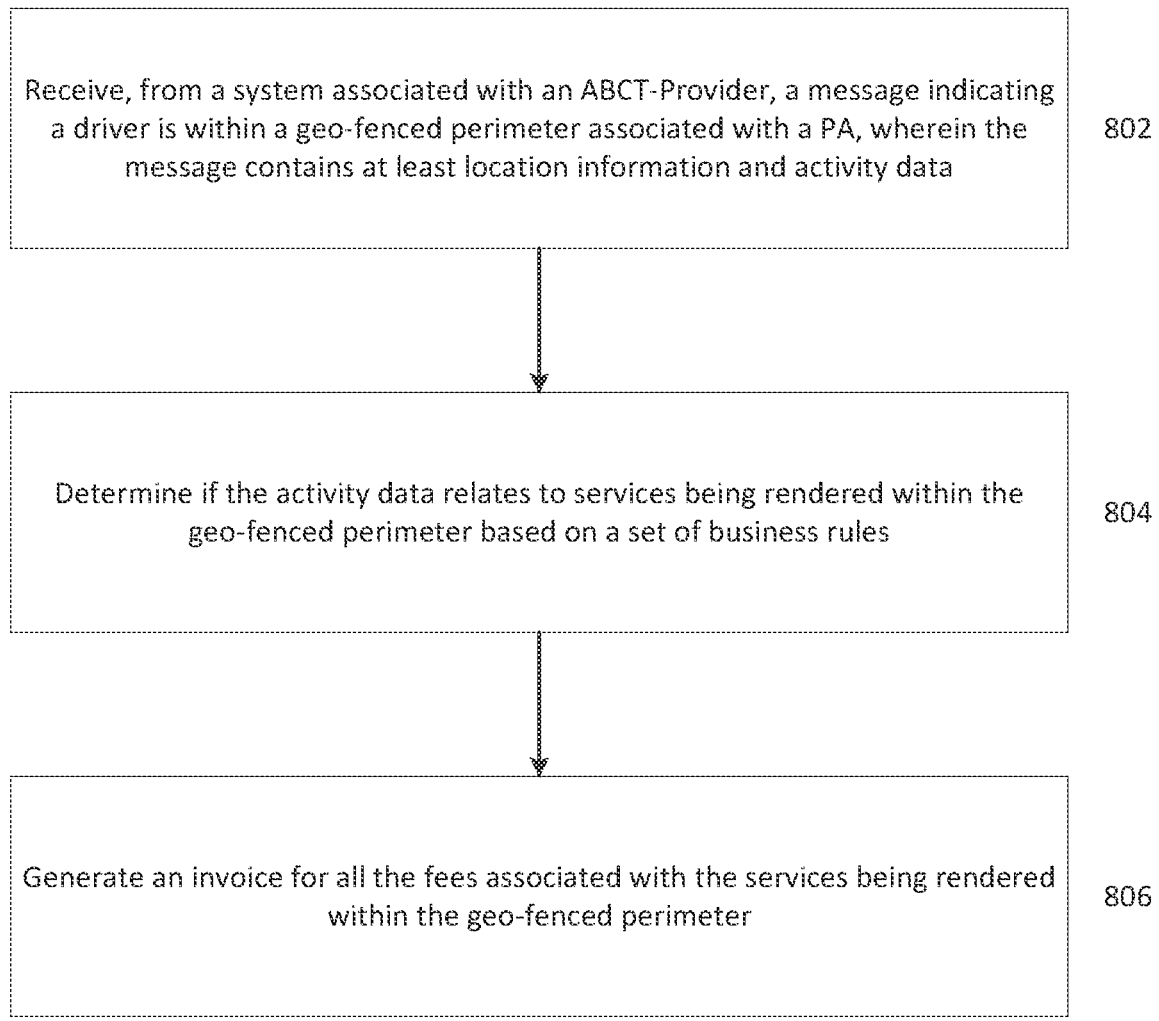
FIG. 8 illustrates a method for billing an ABCT provider for services rendered at a PA, according to one embodiment of the present invention.

FIG. 8 shows a method for billing an ABCT provider for services rendered within a perimeter of a geo-fence, according to one embodiment of the present invention. The method begins at step 802, where a PA ICT System defining a geo-fenced perimeter receives a message from an ABCT provider ICT System. The message comprises at least location information, device identification and activity data. The PA ICT System stores the messages in a data storage.

At step 804, the PA ICT System determines if the activity data contained in the message relates to a service being rendered within the geo-fenced perimeter by an ABCT-Driver. If the activity data relates to a service being rendered within the geo-fenced perimeter, the PA server creates a log of the activity and associates a fee to the activity. For example, if a driver associated with an ABCT picks-up a passenger within a geo-fenced area of a PA, the PA ICT System will create a log of the activity and associate a fee with the pick-up service rendered.

In one embodiment, the PA ICT System periodically queries the data storage for activity data relating to services rendered within the geo-fenced perimeter. For example, the PA ICT System may query the data storage for all ABCT provider activity within a geo-fenced perimeter comprising a pick-up service, drop-off service, entry into the geo-fence and exit from the geo-fence. The PA may charge fees according to a set of business rules for at least one of these activities or all the activities. Additionally, the PA ICT System may periodically query the data storage for violations of the set of business rules. For example, the PA ICT System may generate a list of ABCT-Vehicles that have been within the geo-fence for a period of time that exceeds an allotted period of time as set forth in the set of business rules. The PA may also charge a fee for any of the violations of the set of business rules.

At step 806, the PA ICT System generates an invoice for the ABCT provider comprising the fees for each activity in which a service was rendered within the geo-fenced perimeter. In one embodiment, the PA ICT System compares the activities of an ABCT provider within a specified period with a set of business rules. Based on the correlation and the business rules, a set of fees are determined for the ABCT provider.

Figure 9A:
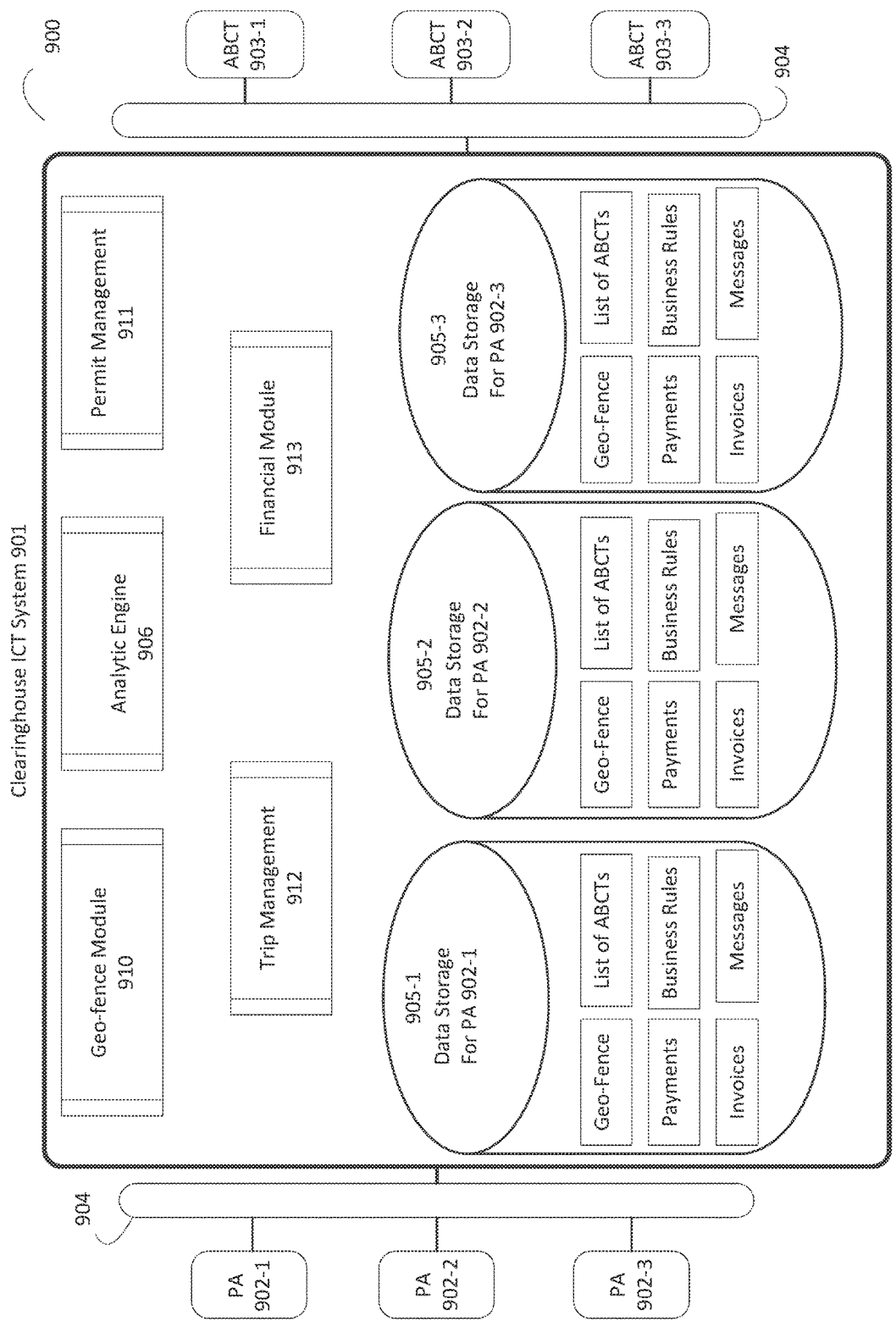

FIG. 9A shows a system for generating an invoice for services provided by an ABCT provider within the perimeters of a geo-fence by a third party such as a national or regional clearinghouse, according to an exemplary embodiment of the present invention. The clearinghouse technology infrastructure 900 includes a clearinghouse ICT system 901 operatively communicating with a plurality of PAs 902-1 to 902-3 and a plurality of ABCT providers 903-1 to 903-3 via network interfaces 904. The clearinghouse ICT system 901 is an intermediary between a plurality of PAs and at least one ABCT provider.

In a typical example, network 904 includes the internet and a local area network used by the PAs 902-1 to 902-3 and the ABCT providers 903-1 to 903-3 to connect to the internet. Both the PAs 902-1 to 902-3 and the ABCT providers 903-1 to 903-3 can communicate with clearinghouse ICT system 901 over network 904 using any number and combination of various protocols known in the art. In an exemplary embodiment, both the PAs 902-1 to 902-3 and the ABCT providers 903-1 to 903-3 can communicate with clearinghouse ICT system 901 via an online portal and/or alternative data interface, as illustrated in FIGS. 9B and 9C, and discussed in further detail below.

The clearinghouse ICT system 901 facilitates business between a plurality of PA facilities and ABCT providers by providing a single point of contact for all transactions. Currently, no single point of contact exists between a plurality of ABCT providers and PA facilities. Instead, each ABCT provider must individually facilitate business with each of the PAs. The clearinghouse ICT system 901 provides a central server as a single point of contact between multiple ABCT providers and PA facilities. This allows multiple PAs and ABCT providers to conduct business via a central server. For example, the clearinghouse ICT system 901 allows a PA to receive formatted transaction information in near real-time from multiple ABCT providers without the PA or the ABCT providers having to install new software or allocate extra computer resources in order to communicate. Additionally, the ABCT providers can register and/or unregister with different PA facilities to operate within their respective geo-fenced areas simply through the clearinghouse ICT system without having to contact and/or negotiate with each PA facility individually. The clearinghouse ICT system 901 also provides technology that can securely aggregate invoices for each of the multiple PAs to create a single invoice for an ABCT provider, and that can securely accept and distribute payments from the PA to the respective ABCT providers.

The clearinghouse ICT system 901 includes data storage 905-1 to 905-3 for storing data related to a plurality of PAs 902-1 to 902-3. As the data is received from each of the PAs 902-1 to 902-3, the data may be processed by a geo-fence module 910, a permit management module 911, and/or a trip management module 912. In an exemplary embodiment, the data from a PA is transmitted to the clearinghouse ICT system 901 via the online portal illustrated in FIGS. 9B-9C.

Figure 9B:
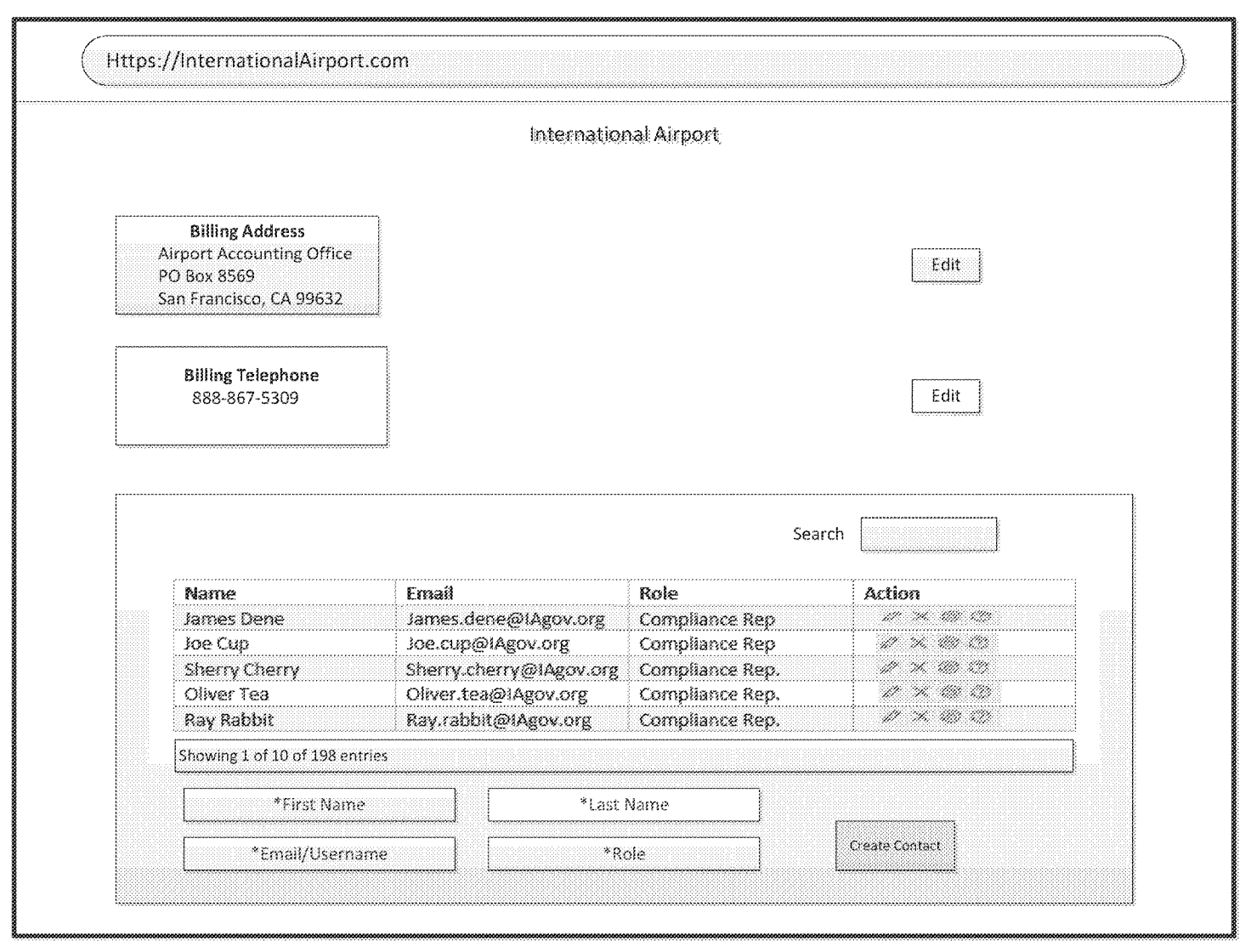

The online portal, illustrated in FIGS. 9B-9C, may provide, among other resources, a central operations feature, a management report feature, or a data storage feature. Generally, the central operations feature provides among other resources, authentication capabilities. A PA may register, via the central operations feature, to become part of the clearinghouse ICT system 901. An ABCT provider may register, via the central operation feature, to become part of the clearinghouse ICT system 901 and to obtain permits from a plurality of PAs that would allow the ABCT drivers to operate within geo-fenced areas associated with the plurality of PAs.

Once a PA registers with the clearinghouse ICT system 901, information such as geo-coordinates associated with the PA facility and business rules can be uploaded and stored in the appropriate data storage 905-1 to 905-3. The PA may also upload a permit for each ABCT provider that registers via the online portal and/or alternative data interface. For example, after an ABCT provider registers with the clearinghouse ICT system 901, a message or notification can be sent to the PA, via the online portal and/or alternative data interface. Once the PA receives the registration message or notification, the PA can upload permits for the ABCT provider. Additionally, the PA may change geo-coordinates associated with the PA facility, business rules, and/or permit statuses for ABCT providers, and the changes can be transmitted to the affected ABCT provider, in real time or near real time. The changes can also be transmitted to mobile devices of compliance managers implementing the security measures within the PA facility. For example, if the PA facility decides to revoke a permit for an ABCT provider, notification of the revocation can be transmitted to the respective ABCT provider as well as the mobile devices of the compliance managers in real time. The compliance managers would then be able to monitor the PA facility to ensure that drivers associated with the ABCT provider are not conducting business within the PA facility. Similarly, the ABCT providers can also change information that is provided to the clearinghouse ICT system in real-time and the clearinghouse ICT system can transmit notification of the changes instantaneously to PA facilities that are affected by the changes.

The management report feature of the online portal may allow PA facilities or ABCT providers to access resources to generate management reports that relate to the respective collective data for a specific PA facility or ABCT provider. In this regard, a PA facility can access data related to a plurality of ABCT providers and/or a single ABCT provider. Similarly, an ABCT provider can access data related to a plurality of PA facilities and/or a single PA facility. The management reports for an ABCT provider may include information related to the activities within the PA facilities, billing information for the respective ABCT drivers within the PA facilities, and information related to permits and business rules associated with to the PA facilities. The management reports for the PA facilities may include information related to the ABCT driver transaction data within the geo-fenced area and billing information for the ABCT providers.

The data storage feature of the online portal may allow PA facilities and/or ABCT providers to upload data in a native format. In one embodiment, the data storage feature may format the data prior to transmitting the data to the clearinghouse ICT system. In another embodiment, the clearinghouse ICT system normalizes data as it is received to ensure data integrity. Data normalization is also a key part of data management that can help improve data cleansing, violation routing, segmentation, deduplication and other data quality processes. Normalization makes sure that all of your data looks and reads the same way across all records. Normalization may standardize fields to include ABCT provider, ABCT driver information, and transaction data in a particular order. Normalization of the data is important because every company has different criteria when it comes to normalizing their data. What one company considers "normal" might not be "normal" for another. The data storage feature of the online portal allows remote users, such as the PA facilities and the ABCT providers, to share information in real time in a standardized format regardless of the format in which the information was received by the PAs or the ABCT providers.

Once a user registers with the clearinghouse ICT system, data that is received, via the online portal and/or alternative data interface, from each of the PAs may be stored in a data storage specific to the respective PA. The data may include a geo-fence coordinate, business rules associated with the PA, and a list ABCT providers allowed to operate within the geo-fenced area.

In particular, the business rules allow the clearinghouse ICT system 901 to manage (i.e. capture, apply and change) bilateral commercial terms agreed between the ABCT providers 903-1 to 903-3 and the PAs 902-1 to 902-3 and apply these terms to the calculations of PA facility fees to the ABCT providers. For example, business rules can be applied to transaction information that is received from ABCT providers in real-time or near real-time and dynamically, as the transaction information is received.

Business rules are received from the PAs 902-1 to 902-3 and stored in their respective PA data storage 905-1 to 905-3.

Each rule may include a logical statement, which sets an output based on a specific input. For example, if a PA agrees with an ABCT provider that it will not charge the ABCT provider for pick-ups between midnight and 5 AM, one of the business rules stored in the PA's data storage 902-1 may include the following logical statement: ABCT=ALL AND Trip_Type==Pick_Up AND Trip_Time>=00:00 AND Trip_Time<=05:00: Trip_Fee=0.

Subsequently, as transactions information is received from the ABCT provider in real-time, the business rules can be applied to the transaction information to determine a payment value that is associated with the transaction information. The payment value may then be stored in the payments table within the data storage for the PA 905-1.

A rule which makes a direct deduction of fees due to the clearinghouse ICT system 901 for its services based on a bilaterally agreed fee structure may also be included in the business rules. For example, at a designated time, usually end of month, the clearinghouse ICT system 901 may transfer all the payments values stored in the payment module within data storage for the PA into the invoice module. The invoice module may then compile a PA-specific invoice for each ABCT provider, which in turn is sent to the financial module 913 for aggregation with other invoices for the specific PA.

Going back to FIG. 9A, each of the PAs 902-1 to 902-3 register and provide geo-fence information, business rules and other related data via an online portal and/or alternative data interface, accessible to PA administrators. The clearinghouse ICT system 901 stores data received from the PAs 902-1 to 902-3 in data storage 905-1 to 905-3. For example, when a PA registers and provides geo-fence information, the geo-fence module 910 validates and stores multiple geo-fence locations, referenced to specific PAs. The clearinghouse ICT system 901 maintains a record of changes and provides the ability to verify whether a specific geographic coordinate is inside or outside of a specific geo-fence.

ABCT providers 903-1 to 903-3 also register with the clearinghouse ICT system 901 via the online portal and/or alternative data interface, and provide information to the clearinghouse ICT system 901 for each of the PAs that the ABCT-Drivers will be operating within. The ABCT providers 903-1 to 903-3 may also provide business rules such as commercial terms for each PA, wherein the clearinghouse ICT system may capture, apply and change bilateral commercial terms agreed between the ABCT providers 903-1 to 903-3 and the PAs 902-1 to 902-3 and apply these terms to the calculations of PA facility fees to the ABCT providers. For example, the permit management module 911 links ABCT providers and PAs, and serves as a repository of all active, suspended, terminated, pending and expired Permits. The permit management module 911 is the source of business rules such as a prevailing trip fee for a drop-off within a specific PA's geo-fence and it provides the capability to calculate fees and charges, to record and alert Permit expiration and renewal dates, and to process and store a record of Permit violations.

In an exemplary embodiment, once the PAs 902-1 to 902-3 and ABCT providers 903-1 to 903-3 are registered, the ABCT providers can transmit messages to the clearinghouse ICT system 901. Each message includes at least one of a current location of a mobile device of an ABCT vehicle associated with an ABCT provider within a predefined geographical boundary associated with a PA and transaction information associated with a service rendered within the predefined geographical boundary. The message including at least one of the current location of the mobile device and/or the transaction information may be transmitted in real-time to the clearinghouse ICT system 901, wherein the clearinghouse ICT system 901 may also dynamically transmit all or part of the transaction information and/or current location of the mobile device to respective PA, as the clearinghouse ICT system 901 receives the message. For example, as ABCT drivers, within a geo-fenced area, drop-off or pick-up passengers, the transaction information and/or information associated with the ABCT drivers (such as current location) is forwarded to the ABCT provider by a mobile device associated with the ABCT driver in real-time. The ABCT provider then generates a message that includes the current location of the mobile device associated with the ABCT driver and/or transaction information, and forwards or distributes the message to the clearinghouse ICT system 901. The trip management 912 module of the clearinghouse ICT system 901 associates the transaction information with the specific PA by parsing the received message, identifying the predefined geographical boundary that the mobile device is currently within, and identifying the PA associated with the predefined geographical boundary. Furthermore, the trip management module 912 stores the received transaction data in the respective PA's data storage 905-1 to 905-3 and transmits the transaction information and/or current location of the mobile device associated with the ABCT-Driver to the identified PA. Alternatively, the message generated by the ABCT provider may further include information specifying the particular PA the message is to be forwarded to. In this case, the trip management module 912 would parse the message to identify the specified PA included in the message and forward the message to the specified PA. In some embodiments, the received transaction data is normalized, formatted and then stored in the PA's data storage 905-1 to 905-3. Additionally or alternatively, the received transaction data is stored in its original raw format for (1) system recovery purposes in the event of a failure or loss of data downstream and (b) for audit and validation purposes.

The trip management module 912 may also validate the format of driver transaction (i.e. trip) information, and verify and/or associate each trip with (1) a valid Permit, (2) an active ABCT provider and (3) a participating PA. The trip management module 912 records all valid trips and provides data feeds to business processes such as billing, compliance and auditing. In some embodiments, the trip management module 912 may use a verification process that checks for valid fields within the received transaction information. For example, the transaction information received from a PA may include an "ABCT id". The "ABCT id" may be validated against the list of ABCT providers that have valid permits at that particular PA. The trip management system 912 may also validate the coordinates provided ("longitude" and "latitude"), as well as the transaction type ("txn_type").

At any time, a PA may access the clearinghouse ICT system 901 via an online portal and/or alternative data interface, and invalidate an ABCT provider's permit by changing an Active_Permit field in the permit management module 911 from enable to disable. The active permit may also be automatically disabled when the ABCT provider's permit is cancelled. If a transaction, for which its corresponding permit is disabled, arrives in the clearinghouse ICT system 901, the clearinghouse ICT system 901 may void that trip and automatically send an exception message to the PA. In some embodiments, when an ABCT provider's permit is enabled or disabled, the clearinghouse ICT system 901 may automatically generate a notification that is sent to the ABCT provider.

As transaction information is received by the clearinghouse ICT system 901 from an ABCT provider, the clearinghouse ICT system 901 automatically routes the transaction information to the respective PA. The clearinghouse ICT system 901 may forward the transaction information or part of the transaction information to the respective PA in parallel with storing the transaction data, so the PA receives the transaction data in real-time or near real-time. Near real-time refers to the time delay introduced, by automated data processing or network transmission, between the occurrence of an event and the use of the processed data, such as for display or feedback and control purposes.

In some embodiments, the clearinghouse ICT system 901 may receive transaction information for an ABCT-Vehicle within a PA's geofence and parse the transaction information to identify ABCT-Vehicle information and the location information. The clearinghouse ICT system 901 can send the PA (near) real-time messages about the location of each ABCT-Vehicle in periodic intervals, such as every 5 seconds, for the duration of its stay within the PA's geo-fence. In another embodiment, the PA may receive one message for (a) geo-fence entry, (b) geo-fence exit, (c) drop-off (inside geo-fence) and (d) pick-up (inside geo-fence).

Once the respective PA receives the transaction data, the PA may then use the near real-time transaction data for time compliance management and safety management, amongst other things. For example, some PA permits limit the length of time an ABCT-Vehicle may spend within the PA's geo-fence. This is often to ensure that ABCT-Vehicles are not using the PA's ABCT-Vehicle holding lot(s) as a convenience or as a free rest area. As the ABCT-Driver's vehicle enters the PA's geo-fence, the ABCT application on the ABCT-Driver's mobile device transmits a message to the ABCT provider that routes it to the clearinghouse ICT system 901. This message contains a timestamp, which records the time that the ABCT-Vehicle arrives on the PA's property. If the PA specifically designates its ABCT-Vehicle holding-lot within its own geo-fence, then the PA will receive a second message, again with a timestamp, when the ABCT-Vehicle leaves the ABCT-Vehicle holding lot. This second message allows the calculation of dwell time in the holding lot and, if applicable, the calculation of an 'over stay' fine.

Likewise, once an ABCT-Vehicle enters a PA's geo-fence, the ABCT-Vehicle's license plate information is transmitted as an ABCT-Vehicle message to the ABCT provider and to the clearinghouse ICT system 901. The clearinghouse ICT system 901 then forwards the information to the respective PA. The PA ICT system reads this message and resends it to a compliance manager's mobile application. The compliance manager, located at the curbside on the PA's property can check, based on the license plate information, whether a particular ABCT-Vehicle is complying with the requirements of the PA's permit. For example, the compliance manager can validate that the ABCT-Vehicle is displaying the correct decals. The compliance manager's mobile application allows ABCT-Vehicle transactions to be sorted by time, ABCT Provider, and license plate number.

The clearinghouse ICT system 901 also includes an analytic engine 906 operatively connected to the data storage 905-1 to 905-3. The analytic engine 906 may access the data storage 905-1 to 905-3 and provide data to the financial module 913. The financial module 913 may calculate fees, generate invoices and process payments for each of the ABCT providers servicing each of the PAs, as described below. The invoices and/or payments information may be stored in the data storage 905-1 to 905-3.

In one embodiment, the clearinghouse ICT system 901 may receive payment information from ABCT providers 903-1 to 903-3. The payment information relates to a payment from an ABCT provider for an invoice of transactions occurring within the geo-fenced area associated with a PA. For instance, the ABCT provider may receive one invoice from the clearinghouse ICT system 901, which itemizes aggregates of their transactions at respective PAs for a specific period. Correspondingly, each PA receives one payment which itemizes the aggregate of each ABCT-Driver's trips to that PA during the billing period (less any applicable clearinghouse ICT system 901 processing fees).

In an embodiment, the clearinghouse ICT system 901 may verify at least a portion of the payment information and store at least a portion of the payment information in a database. The clearinghouse ICT system 901 then may transmit a first electronic file comprising at least a portion of the payment information to a PA associated with the invoice. In one embodiment, the clearinghouse ICT system 901 may transmit a second electronic file comprising at least a confirmation of the payment to the PA from the ABCT providers 903-1 to 903-3. Furthermore, the clearinghouse ICT system 901 may also generate and transmit, to both the PA and the ABCT provider, and accounting of all invoices and payments by the PA and the ABCT provider in response to a request for the accounting.

For instance, the clearinghouse ICT system 901 may calculate the payment information based on the transaction information for each PA and then forward the payment information to ABCT providers 903-1 to 903-3 and/or the PAs 902-1 to 902-3.

The clearinghouse ICT system 901 may provide the payment information to the ABCT providers 903-1 to 903-3 and/or the PAs 902-1 to 902-3 on a rolling basis as transaction information is received. The clearinghouse ICT system 901 may also periodically aggregate received transaction information for the purposes of calculating aggregated ABCT provider service charges at each of the clearinghouse ICT system 901 participating PAs and provide the payment information to the ABCT providers 903-1 to 903-3 and/or the PAs 902-1 to 902-3. The periodic aggregation of the transaction information may also be used for the purpose of supporting participating PAs audit requirements. For instance, the PA may, via the online portal and/or alternative data interface, request data associated with the transaction information to perform audits on the number of ABCT-Drivers that conduct transactions within the PA's geo-fenced location.

During an audit, the auditor for the PA may request a random sample of ABCT transactions, or random batch of transactions, occurring in a specific time period from the clearinghouse ICT system 901. For example, an auditor for a PA may have the right (in the permit) to get from an ABCT provider all of the ABCT provider's information pertaining to those selected transactions. The auditor can then compare both sets of information for any discrepancies. The auditor may validate that the ABCT provider can prove that it paid the PA for the selected transactions. Also, the auditor may request from an ABCT provider all transactions recorded on the ABCT provider's systems for a specific time period. The auditor may compare these transactions against the information in the PA ICT systems (received from the ABCT provider) for discrepancies.

In addition to sending the payment information or invoices to the ABCT providers 903-1 to 903-3 for service charges of drivers within the geo-fenced area of a PA, in one embodiment, the clearinghouse ICT system 901 may collect payments from the ABCT providers 903-1 to 903-3 and transmit the payment to the PAs 902-1 to 902-3. Furthermore, the clearinghouse ICT system 901 may also offer proper accounting for the service charges. The clearinghouse ICT system 901 also may forward to the ABCT providers 903-1 to 903-3 and/or PAs 902-1 to 902-3 fees charges associated with the use of the clearinghouse ICT system 901.

Figure 10:
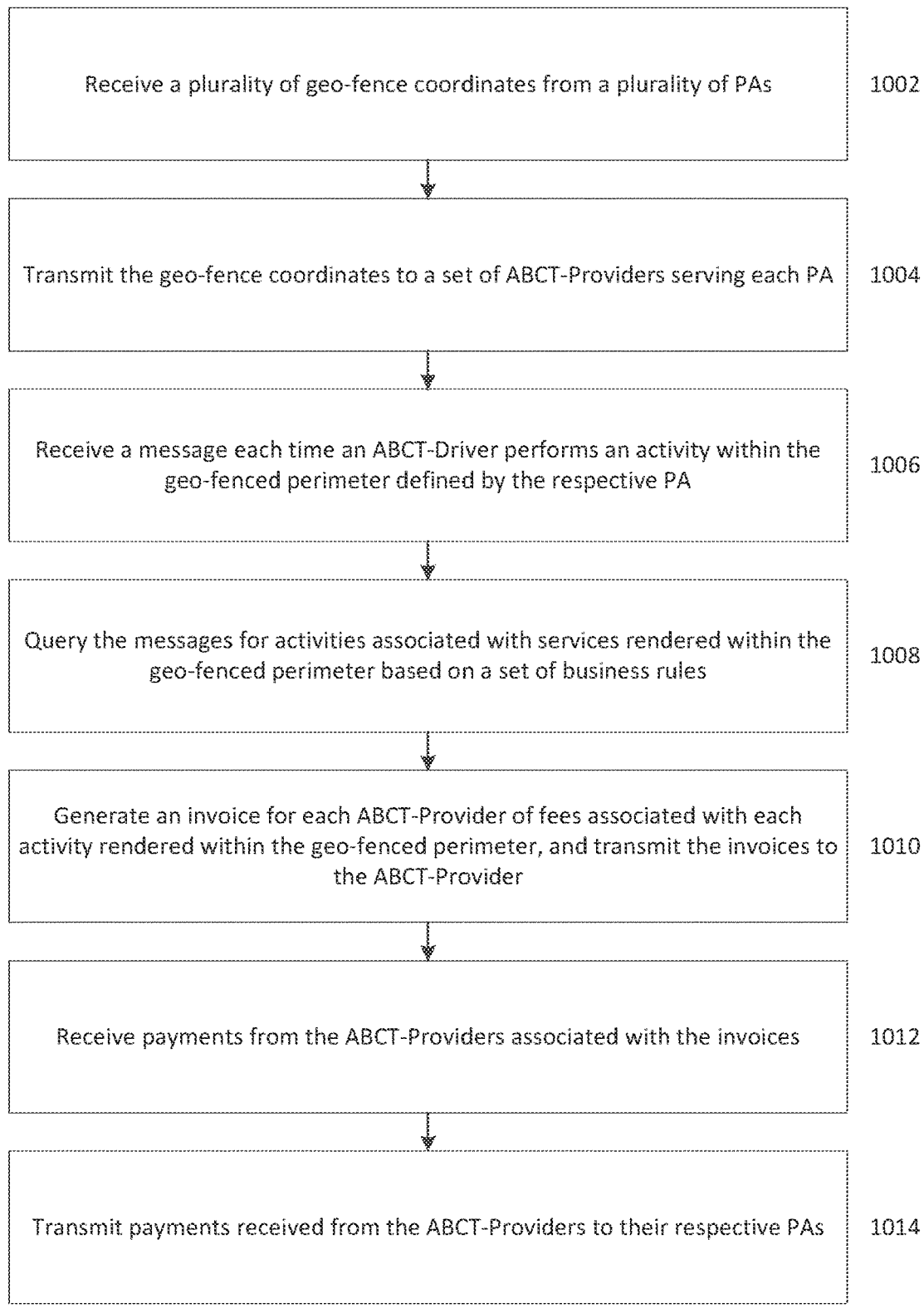
FIG. 10 illustrates a method for billing multiple ABCT providers for services rendered at multiple PAs, according to one embodiment of the present invention.

FIG. 10 shows a method for invoicing an ABCT provider for services rendered within a perimeter of a geo-fence through a third party such as a national or regional clearinghouse, according to one embodiment of the present invention. The method begins at step 1002, where a clearinghouse ICT system receives a plurality of geo-fence perimeter coordinates from a plurality of PAs. The PAs, in one embodiment, may provide additional information such as ABCT provider business rules.

At step 1004, the clearinghouse ICT system transmits the geo-fence perimeters to a set of ABCT providers servicing each PA. For example, drivers of an ABCT provider may be providing pick-up and drop-off services to customers at the San Francisco International Airport and the Oakland International Airport. The clearinghouse ICT system will send to the ABCT provider the geo-fence perimeter information for both the San Francisco International Airport and the Oakland International Airport.

At step 1006, the clearinghouse ICT system receives a message each time the ABCT-Driver performs an activity defined in any of the Permits to which the ABCT provider is a party. Each message is stored within a data storage and is associated with its respective PA.

In one embodiment, the clearinghouse ICT system transmits the received messages, in real-time, to the PA ICT System for monitoring by the PA of ABCT provider activities within a PA's geo-fenced area. In another embodiment, the clearinghouse server queries the received messages and compares them to a set of business rules. If there is a violation of the business rules, a notification is sent to the PA ICT System.

At step 1008, the clearinghouse server queries the messages for activities associated with services rendered within the geo-fenced perimeter. For example, the clearinghouse may query pick-up services or drop-off services that have taken place within the geo-fenced perimeter. The query may be done periodically, such as daily, weekly or monthly or upon request.

At step 1010, the clearinghouse ICT system generates an invoice for each ABCT provider of fees associated with each Permit and/or services rendered within a PA's geo-fenced perimeter, and transmits the invoices to the corresponding ABCT providers.

At step 1012, the clearinghouse server receives payments from the ABCT providers associated with the invoices.

At step 1014, the clearinghouse server sends payments received from the ABCT providers to their respective PAs.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. An example of a suitable computing system environment in which the invention may be implemented, although as made clear above, the computing system environment is only one example of a suitable computing environment and is not intended to suggest any limitation as to the scope of use or functionality of the invention. Neither should the computing environment be interpreted as having any dependency or requirement relating to anyone nor combination of components illustrated in the exemplary operating environment.

Computing device typically includes a variety of computer readable media. Computer readable media can be any available media that can be accessed by computer and includes both volatile and nonvolatile media, removable and non-removable media. By way of example, and not limitation, computer readable media may comprise tangible computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data. While communication media includes non-ephemeral buffers and other temporary digital storage used for communications, it does not include transient signals in as far as they are ephemeral over a physical medium (wired or wireless) during transmission between devices. Combinations of any of the above should also be included within the scope of computer readable media. The system memory includes computer storage media in the form of volatile and/or nonvolatile memory such as read only memory (ROM) and random access memory (RAM). The processing unit and bus allow for transfer of information between elements within computer, such as during start-up, typically stored in ROM. RAM typically contains data and/or program modules that are immediately accessible to and/or presently being operated on by processing unit.

The computer may also include other removable/non-removable, volatile/nonvolatile computer storage media include, but are not limited to, magnetic tape cassettes, flash memory cards, digital versatile disks, Blu-Ray disks, digital video tape, solid state RAM, solid state ROM, and the like. The hard disk drive is typically connected to the system bus through a non-removable memory interface such as interface, or removably connected to the system bus by a removable memory interface, such as interface.

The drives and their associated computer storage media discussed above provide storage of computer readable instructions, data structures, program modules and other data for the computer. For example, disk drive is illustrated as storing operating system, application programs, other program modules, and program data. Note that these components can either be the same as or different from operating system, application programs, other program modules, and program data. Operating system, application programs, other program modules, and program data are given different numbers here to illustrate that, at a minimum, they are different copies. A user may enter commands and information into the computer through input devices such as a keyboard and pointing device, commonly referred to as a mouse, trackball or touch pad. Other input devices may include a microphone, joystick, game pad, satellite dish, depth or motion sensor, scanner, or the like. These and other input devices are often connected to the processing unit through the system bus, but may be connected by other interface and bus structures, such as a parallel port, game port, or a universal serial bus (USB). A monitor or other type of display device is also connected to the system bus via an interface, such as a video interface. In addition to the monitor, computers may also include other peripheral output devices such as speakers and printer, which may be connected through an output peripheral interface.

One of ordinary skill in the art can appreciate that a computer or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a stand-alone computing device, having programming language functionality, interpretation and execution capabilities.

In view of the foregoing, the scope of the present invention is determined by the claims that follow.

The invention claimed is:

1. A method, comprising:
   receiving, at a clearinghouse system from one or more PAs, a predefined geographical boundary and a business rule set;
   receiving, at the clearinghouse system, a plurality of messages from one or more ABCT providers, each message of the plurality of messages including at least one of (1) location information associated with a current location of a mobile device of an ABCT-Vehicle associated with an ABCT provider of the one or more ABCT providers within a predefined geographical boundary associated with a PA of the one or more PAs and (2) transaction information associated with a service rendered within the predefined geographical boundary, the messages being received by the clearinghouse system in near real-time as information systems associated with the one or more ABCT providers receives location information and transaction information from mobile devices corresponding with one or more ABCT-Vehicles associated with the one or more ABCT providers;
   parsing, at the clearinghouse system, each of the plurality of messages to identify the PA associated with the predefined geographical boundary included in each of the plurality of messages; and
   transmitting, from the clearinghouse, each of the plurality of messages to the corresponding identified PA in near real time.

2. The method of claim 1, wherein transmission of at least one of the plurality of messages causes information about each ABCT provider activity being performed at the corresponding identified PA to be displayed in near-real time on a web-based application.

3. A system, comprising:
   one or more processors; and
   a non-transitory computer readable medium storing a plurality of instructions, which when executed, cause the one or more processors to
   receive, at a clearinghouse system, a plurality of messages from one or more ABCT providers, each message of the plurality of messages including at least one of (1) location information associated with a current location of a mobile device of an ABCT-Vehicle associated with an ABCT provider of the one or more ABCT providers within a predefined geographical boundary associated with a PA of the one or more PAs and (2) transaction information associated with a service rendered within the predefined geographical boundary, the messages being received by the clearinghouse system in near real-time as information systems associated with the one or more ABCT providers receives location information and transaction information from mobile devices corresponding with one or more ABCT-Vehicles associated with the one or more ABCT providers;
   parse, by the clearinghouse system, each received message to identify a set of fields within each of the messages;
   determine, by the clearinghouse system, whether data within the identified set of fields is valid;
   transmit, by the clearinghouse system, a first notification to an information system of the ABCT provider associated with the message when the data within the identified set of fields is invalid; and
   transmit, by the clearinghouse system, a second notification to the PA associated with the message when the data within the identified set of fields is invalid.

4. The system of claim 3, further comprising, storing each of the messages having identified the set of fields that are valid.

5. The system of claim 3, further comprising, storing, by the clearinghouse system, records corresponding to the one or more ABCT providers, each record comprising a plurality of fields, at least one field being an active permit field.

6. The system of claim 5, wherein the records are accessible through at least one of an online portal or alternative data interface; and wherein the at least one online portal or alternative data interface enables the PA to change a status data in the active permit field of a record corresponding to the ABCT provider, the status data including at least an enabled status and a disabled status.

7. The system of claim 6, further comprising, automatically changing the status data in the active permit field of the record corresponding to the ABCT provider from enabled to disabled when a valid permit associated with the ABCT provider has expired.

8. The system of claim 7, wherein determining whether data within the identified set of fields is valid includes: identifying an ABCT provider identification included in the data; determining associating the ABCT provider identification to the ABCT provider; and determining whether the ABCT provider has a valid permit to operate within the predefined geographical boundary of the PA based on the status data within the active permit field in the record associated with the ABCT provider.

9. The system of claim 3, wherein parsing each received message to identify a set of fields within each of the messages, includes identifying a unique code, the unique code corresponding to at least the ABCT provider and the ABCT-Vehicle.

10. The system of claim 9, wherein transmitting the first notification and the second notification being based on the data within the identified set of fields being invalid and being based on identification of the unique code.

11. The system of claim 3, wherein the first notification being in a format associated with the ABCT provider; and wherein the second notification being in a different format than the first notification and being associated with the PA.

12. The system of claim 3, wherein the clearinghouse system comprises at least one of an online portal or alternative data interface, the at least one of the online portal or alternative data interface allowing each of the one or more ABCT providers to register with the one or more PAs to operate within the predefined geographical boundaries of the one or more PAs.

13. A method, comprising:
receiving, at a clearinghouse system, a plurality of messages from one or more ABCT providers, each message of the plurality of messages including at least one of (1) location information associated with a current location of a mobile device of an ABCT-Vehicle associated with an ABCT provider of the one or more ABCT providers within a predefined geographical boundary associated with a PA of the one or more PAs and (2) transaction information associated with a service rendered within the predefined geographical boundary, the messages being received by the clearinghouse system in near real-time as information systems associated with the one or more ABCT providers receives location information and transaction information from mobile devices corresponding with one or more ABCT-Vehicles associated with the one or more ABCT providers;
parsing, by the clearinghouse system, each of the received messages to identify a set of fields;
determining, by the clearinghouse system, whether data within the identified set of fields is valid for each of the received messages; and
in response to a determination that the data within the identified set of fields is invalid in a message of the received messages,
transmitting, by the clearinghouse system, a first notification to an information system of an ABCT provider corresponding to the message; and
transmitting, by the clearinghouse system, a second notification to a PA corresponding to the message.

14. The method of claim 13, further comprising storing each of the received messages having identified set of fields that are valid.

15. The method of claim 14, further comprising storing, by the clearinghouse system, records corresponding each of the one or more ABCT providers, each record comprising a plurality of fields, at least one field being an active permit field.

16. The method of claim 15, wherein the records are accessible through at least one of an online portal or alternative data interface; and wherein each of the one or more PAs is enabled to change the status data within an active permit field in a record corresponding to an ABCT, the status data including at least an enabled status and a disabled status.

17. The method of claim 16, further comprising automatically changing the status data in the active permit field of the record corresponding to the ABCT provider from enabled to disabled when a valid permit associated with the ABCT provider has expired.

18. The method of claim 17, wherein determining whether data within the identified set of fields is valid includes: identifying an ABCT provider identification included in the data; determining associating the ABCT provider identification to the ABCT provider; and determining whether the ABCT provider has a valid permit to operate within the predefined geographical boundary of the PA based on the status data within the active permit field in the record associated with the ABCT provider.

19. The method of claim 13, wherein parsing each received message to identify a set of fields within each of the messages, includes identifying a unique code, the unique code corresponding to at least the ABCT provider and the ABCT-Vehicle.

20. The method of claim 19, wherein transmitting the first notification and the second notification being based on the data within the identified set of fields being invalid and being based on identification of the unique code.

21. The method of claim 13, wherein the first notification being in a format associated with the ABCT provider; and wherein the second notification being in a different format than the first notification and being associated with the PA.

22. The method of claim 13, wherein the clearinghouse system comprises at least one of an online portal or alternative data interface, the at least one of the online portal or alternative data interface allowing each of the one or more ABCT provider to register with the one or more PAs to operate within the predefined geographical boundaries of the one or more PAs.

23. A method, comprising:
storing, at a clearinghouse system, registration information associated with one or more ABCT providers, the registration information including permits and statuses of each permit provided by one or more PAs;
storing, at the clearinghouse system, PA information associated with the one or more PAs, the PA information including at least a predefined geographical boundary, PA business rules and a list of ABCT providers authorized to operate within the predefined geographical boundary associated with the corresponding PAs;
receiving, at the clearinghouse system, a plurality of messages from one or more ABCT providers, each message of the plurality of messages including at least one of (1) location information associated with a current location of a mobile device of an ABCT-Vehicle associated with an ABCT provider of the one or more ABCT providers within a predefined geographical boundary associated with a PA of the one or more PAs and (2) transaction information associated with a service rendered within the predefined geographical boundary, the messages being received by the clearinghouse system in near real-time as information systems associated with the one or more ABCT providers receives location information and transaction information from mobile devices corresponding with one or more ABCT-Vehicles associated with the one or more ABCT providers;
determining, at the clearinghouse system, a payment value associated with each of the plurality of messages by applying at least one PA business rule associated with the transaction information included in each of the plurality of messages from the one or more ABCT providers, the payment value being one of a zero value or non-zero value;
generating, at the clearinghouse system, an invoice for each of the one or more ABCT providers based on the determined payment values associated with the transaction information and business rules for each of the one or more PAs;
generating, at the clearinghouse system, a service payment to each of the one or more PAs based on the determined payment values associated with the transaction information and business rules for each of the one or more PAs.

24. The method of claim 23, wherein the clearinghouse system comprises at least one of an online portal or alternative data interface, the at least one online portal or alternative data interface, enabling: (1) the one or more ABCT providers to register with the one or more PAs, (2) the one or more PAs to provide the PA information to the clearinghouse system, (3) the one or more PAs to upload the permits for the one or more ABCT providers, (4) the PAs to change at least one of the stored the predefined geographical boundary, the PA business rules, or the status of the permit associated with the one or more ABCT providers, and (5) the one or more ABCT providers to provide payments based on the generated invoice.

25. The method of claim 23, wherein generating an invoice includes:
   aggregating the plurality of invoices associated with each of the one or more ABCT provider for a period of time; and
   transmitting the aggregated invoices to the corresponding ABCT provider via the at least one online portal or alternative data interface, the aggregated invoices including at least one of transaction fees and applicable taxes.

26. The method of claim 23, wherein generating the service payment includes:
   aggregating a plurality of service payments associated with the one or more PAs for a period of time; and
   transmitting the aggregated service payments to the corresponding PA via the at least one online portal or alternative data interface, the aggregated invoices including at least one of transaction fees and applicable taxes.

27. The method of claim 24, further comprising:
   generating a notification in response to a change to at least one of the predefined geographical boundaries associated with the one or more PAs, the PA business rules, or the status of the permit associated with the ABCT provider; and
   transmitting the notification to the ABCT provider or to a compliance managers associated with the PA.

28. A system, comprising:
   one or more processors; and
   a non-transitory computer readable medium storing a plurality of instructions, which when executed, cause the one or more processors to
   store, registration information associated with one or more ABCT providers, the registration information including permits and statuses of each permit provided by one or more PAs;
   store, at the clearinghouse system, PA information associated with one or more of the plurality of PAs, the PA information including at least a predefined geographical boundary, PA business rules and a list of ABCT providers authorized to operate within the predefined geographical boundary associated with the corresponding PA;
   receive, at the clearinghouse system, a plurality of messages from one or more ABCT providers, each message of the plurality of messages including at least one of (1) location information associated with a current location of a mobile device of an ABCT-Vehicle associated with an ABCT provider of the one or more ABCT providers within a predefined geographical boundary associated with a PA of the one or more PAs and (2) transaction information associated with a service rendered within the predefined geographical boundary, the messages being received by the clearinghouse system in near real-time as information systems associated with the one or more ABCT providers receives location information and transaction information from mobile devices corresponding with one or more ABCT-Vehicles associated with the one or more ABCT providers;
   determine, at the clearinghouse system, a payment value associated with each of the plurality of messages by applying at least one PA business rule associated with the transaction information included in each of the plurality of messages from the one or more ABCT providers, the payment value being one of a zero value or non-zero value;
   generating, at the clearinghouse system, an invoice for each of the one or more ABCT providers based on the determined payment values associated with the transaction information and business rules for each of the one or more PAs;
   generating, at the clearinghouse system, a service payment to each of the one or more PAs based on the determined payment values associated with the transaction information and business rules for each of the one or more PAs.

29. The system of claim 28, wherein the clearinghouse system comprises at least one of an online portal or alternative data interface, the at least one online portal or alternative data interface, enabling: (1) the one or more ABCT providers to register with the one or more PAs, (2) the one or more PAs to provide the PA information to the clearinghouse system, (3) the one or more PAs to upload the permits for the one or more ABCT providers, (4) the PAs to change at least one of the stored the predefined geographical boundary, the PA business rules, or the status of the permit associated with the one or more ABCT providers, and (5) the one or more ABCT providers to provide payments based on the generated invoice.

30. The system of claim 28, wherein generating an invoice includes:
   aggregate the plurality of invoices associated with each of the one or more ABCT provider for a period of time; and
   transmit the aggregated invoice to the ABCT provider via the at least one online portal or alternative data interface, or other means of electronic communication.

31. The system of claim 28, wherein generating a service payment includes:
   aggregating a plurality of service payments associated with one or more PA for a period of time; and
   transmitting the aggregated invoices to the corresponding ABCT provider via the at least one online portal or alternative data interface, the aggregated invoices including at least one of transaction fees and applicable taxes.

32. The system of claim 29, further comprising:
   generate a notification in response to a change to at least one of the predefined geographical boundaries associated with the one or more PAs, the PA business rules, or the status of the permit associated with the ABCT provider; and
   transmit the notification to the ABCT provider or to a compliance managers associated with the PA.

* * * * *